United States Patent [19]
Tokoro

[11] Patent Number: 5,101,350
[45] Date of Patent: Mar. 31, 1992

[54] CONTROL METHOD AND APPARATUS FOR SHIFTING AUTOMATIC TRANSMISSION FROM ONE POSITION TO ANOTHER

[75] Inventor: Setsuo Tokoro, Susono, Japan

[73] Assignee: Toyota Jidosha Kabushiki Kaisha, Japan

[21] Appl. No.: 352,498

[22] Filed: May 16, 1989

[30] Foreign Application Priority Data

May 18, 1988 [JP] Japan .................. 63-121230

[51] Int. Cl.$^5$ ........................ B60K 41/18
[52] U.S. Cl. ................... 364/424.1; 74/866
[58] Field of Search ........... 74/866; 364/424.1

[56] References Cited

U.S. PATENT DOCUMENTS

| | | | |
|---|---|---|---|
| 4,630,508 | 12/1986 | Klatt | 364/424.1 X |
| 4,809,175 | 2/1989 | Hosaka et al. | 364/424 |
| 4,841,815 | 6/1989 | Takahashi | 74/866 |
| 4,842,342 | 6/1989 | Takahashi et al. | 364/424.02 |
| 4,911,259 | 3/1990 | Dogahara et al. | 180/170 |
| 4,916,779 | 4/1990 | Irwin | 364/424.1 X |
| 4,930,084 | 3/1990 | Hosaka et al. | 364/426.04 |
| 4,947,329 | 8/1990 | Benford et al. | 364/424.1 |
| 4,947,331 | 8/1990 | Speranza | 364/424.1 |
| 4,958,288 | 9/1990 | Takahashi | 364/426.04 |
| 4,975,845 | 12/1990 | Mehta | 74/866 X |
| 5,019,979 | 5/1991 | Takahashi | 364/424.1 |
| 5,021,958 | 6/1991 | Tokoro | 364/426.04 |

FOREIGN PATENT DOCUMENTS

| | | |
|---|---|---|
| 48-9729 | 3/1973 | Japan . |
| 62-37549 | 2/1987 | Japan . |
| 62-63251 | 3/1987 | Japan . |
| 63-24654 | 10/1988 | Japan . |
| 1-9036 | 1/1989 | Japan . |

Primary Examiner—Kevin J. Teska
Assistant Examiner—Thomas S. Auchterlonie
Attorney, Agent, or Firm—Oblon, Spivak, McClelland, Maier & Neustadt

[57] ABSTRACT

A method of controlling an automatic transmission for a motor vehicle having a plurality of operating positions such that the operating positions are automatically selected. A plurality of control rules and a plurality of logical equations are provided such that the control rules and logical equations correspond to the operating positions of the transmission. Each of the control rules consists of a plurality of sub-rules for effecting determinations associated with running conditions of the motor vehicle. A logical operation of each control rule is performed according to a corresponding one of the logical equations, based on results of the determinations of the sub-rules corresponding to each control rule. A decision is made as to whether the each control rule is satisfied, or not. The transmission is shifted to one of the operating positions which corresponds to the control rule which is satisfied.

25 Claims, 14 Drawing Sheets (ESTIMATED Ne WHEN SHIFTED TO N+ΔN)

(ESTIMATED Ne WHEN LOCK-UP CLUTCH CONTROL VALVE IS ON AND OFF)

CONTROL METHOD AND APPARATUS FOR SHIFTING AUTOMATIC TRANSMISSION FROM ONE POSITION TO ANOTHER

BACKGROUND OF THE INVENTION

1. Field of the Invention

The present invention relates to method and apparatus for controlling an automatic transmission having a plurality of operating positions, to effect an automatic shifting operation from one position to another, and more particularly to improvements in such control method and apparatus, for selecting the optimum operating position of the transmission, with a relatively simple control program.

2. Discussion of the Prior Art

An automatically shifted transmission having a plurality of operating positions is widely used for motor vehicles, for example. The transmission includes a gear mechanism, a plurality of hydraulically operated frictional coupling units or devices associated with the gear mechanism, and a hydraulic actuator for operating the frictional coupling units. The frictional coupling units are automatically engaged or disengaged by the hydraulic actuator, in order to selectively establish the operating positions of the transmission.

A control apparatus for controlling the hydraulic actuator generally includes a shift lever operated by a vehicle driver, a shift position sensor for detecting the currently selected position of the shift lever, a vehicle speed sensor for detecting the running speed of the vehicle, and a throttle position sensor for detecting the opening of a throttle valve of the vehicle, which is used as a parameter that reflects or represents the output of the vehicle engine desired by the vehicle driver. In response to the signals from the shift position sensor, vehicle speed sensor and throttle position sensor, the control apparatus regulates the hydraulic actuator to control the engaging and disengaging actions of the frictional coupling units, for selecting the optimum operating position of the transmission, according to predetermined shift pattern relationships between the vehicle speed and the throttle opening, and depending upon the currently selected position of the transmission.

An example of the shift pattern relationships is illustrated in FIG. 22. Suppose the vehicle is running in a condition indicated by point "A" in FIG. 22, i.e., at a running speed n1, and with the throttle valve opening set at $\theta 1$ and the transmission placed in its 4th-speed position, and suppose the accelerator pedal is depressed to increase the throttle opening from $\theta 1$ to $\theta 2$ as indicated by point "B" in the figure, the automatic transmission is shifted from the 4th-speed position to the 3rd-speed position, since the transition from the point "A" to the point "B" results in the passage across a boundary (4→3) for shifting down the transmission from the 4th-speed position to the 3rd-speed position.

The conventionally controlled automatic transmission is shifted up and down, principally according to shift-up and shift-down boundaries, which are predetermined shift pattern relationships between the throttle opening and the vehicle running speed, as exemplified above. These shift pattern relationships or boundaries as illustrated in FIG. 22 are suitably modified or adjusted, depending upon the running condition of the vehicle. Various modes of adjustment of the shift pattern relationships have been proposed.

For instance, laid-open Publication No. 62-63251 of unexamined Japanese Patent Application discloses an arrangement wherein the signal generated by a vehicle speed sensor is compensated for by a temperature of the lubrication oil in the automatic transmission, so that shifting actions of the transmission occur at comparatively higher speeds of the vehicle with the same throttle opening when the oil temperature is relatively low, while the shifting actions occur at comparatively lower vehicle speeds with the same throttle opening when the oil temperature is relatively high. This arrangement permits to maintain the engine speed at a relatively high level while the engine is relatively cold, whereby the warming-up of the engine is accelerated, and the vehicle is smoothly driven.

Laid-open Publication No. 48-9729 of examined Japanese Patent Application proposes a technique for adjusting the shift pattern relationships depending upon the detected steering angle of the vehicle, so that shift-down actions of the transmission are inhibited to avoid a driver's unexpected increase in the drive force, when the steering angle exceeds a predetermined limit.

Laid-open Publication No. 62-37549 of unexamined Japanese Patent Application discloses a technique for adjusting the shift pattern relationships depending upon the detected gradient of the road surface on which the vehicle is running.

In the conventional methods of controlling the automatic transmission as indicated above, the shift pattern relationships between the throttle opening and the vehicle speed must be adjusted or compensated for, depending upon the selected running condition of the vehicle such as the transmission oil temperature, steering angle or road surface gradient, while satisfying the driver's requirement.

Described more specifically, the control apparatus for the automatic transmission must have many sets of shift pattern relationships which correspond to different values of the selected running parameter represented by a signal received from the appropriate sensor such as the temperature sensor. Alternatively, a set of basic shift pattern relationships for the standard or normal vehicle running condition must be adjusted by the signal received from the sensor. In the former case, the control apparatus must use a large-capacity memory for storing data representative of many sets of shift pattern relationships. In the latter case, the control apparatus tends to be complicated due to additional control programs executed to effect the adjustments of the basic shift pattern relationships.

Another problem encountered in the conventional control arrangements is derived from the use of the throttle opening and the vehicle running speed as the basic parameters for selecting the optimum operating position of the automatic transmission. That is, the control program does not directly deal with the optimum operating position of the transmission per se, but is executed to indirectly determine the optimum position of the transmission depending upon the adjusted throttle opening-vehicle speed relationships. As a result, the adjustment of the shift-pattern relationships depending upon two or more parameters (such as the oil temperature and road surface gradient) may sometimes cause a driver's unexpected shifting action of the transmission, i.e., the newly selected position of the transmission being contrary to the requirement or desire of the driver under a certain vehicle running condition.

As described above, while the transmission oil temperature is relatively low, a shift-up action of the transmission can occur only after the vehicle speed exceeds a relatively high level, that is, only after the engine speed exceeds a relatively high level. Similarly, the engine speed is maintained at a relatively high level to provide a comparatively increased drive force when the vehicle is running a relatively steep uphill road. Therefore, as a result of the adjustment of the shift pattern relationships by the oil temperature and road surface gradient, the transmission will not be shifted up until the engine speed rises to a considerably high level, where the transmission oil temperature is relatively low and the road surface gradient is relatively large.

Another drawback arises if the shift pattern relationships are adjusted by the steering and the road surface gradient. That is, the control apparatus cannot deal with two contradictory requirements, i.e., the inhibition of a shift-down action of the transmission to avoid an unexpected increase in the vehicle drive force while the steering angle is larger than the predetermined limit, on the one hand, and the requirement for a shift-down action to increase the drive force while the road surface gradient is larger than the predetermined limit, on the other hand. This situation may occur when the vehicle is running up a steep curved slope. This sort of interference between the different control parameters often occurs and cannot be ignored if the number of the control parameters is relatively large. However, it is hardly possible to eliminate such a control interference, for smooth running of the vehicle as desired by the driver, with the transmission placed in the optimum operating position.

Recently, there is a growing tendency toward increasing the number of control parameters or vehicle running conditions for controlling the automatic transmission in a more sophisticated way. However, the practically resulting outcome is away from the optimum control of the transmission that meets the driver's requirement. This tendency increases with the number of the control parameters.

SUMMARY OF THE INVENTION

The present invention was developed in view of the drawbacks experienced in the prior art discussed above. It is therefore a first object of the present invention to provide an improved method of controlling an automatic transmission having a plurality of operating positions, which method can be practiced with a relatively simple control program, to select an currently optimum position of the transmission, depending upon various control parameters, so as to assure an optimum condition of the vehicle (such as the drive force or acceleration value that can be felt by the driver), without an interference between the control parameters.

A second object of the invention is to provide an apparatus suitable for practicing the method of the invention described above.

The first object may be achieved according to one aspect of the invention, which provides a method of controlling an automatic transmission for a motor vehicle having a plurality of operating positions such that the operating positions are automatically selected, comprising the steps of: preparing a plurality of control rules and a plurality of logical equations which correspond to the operating positions of the transmission, each of the control rules consisting of a plurality of sub-rules for effecting determinations associated with running conditions of the motor vehicle; effecting a logical operation of each control rule according to a corresponding one of the logical equations, based on results of the determinations of the sub-rules corresponding to the relevant control rule, and making a decision as to whether each control rule is satisfied, or not; and effecting a shifting action of the transmission to select one of the operating positions which corresponds to the control rule which is satisfied.

Basically, the selection of an optimum position of the transmission that is to be selected next should be attained so as to meet a driver's intention or requirement(s). To this end, the driver's intention should be accurately or adequately estimated, and the next established position of the transmission should be selected based on the estimation.

In the conventional systems, two-dimensional shift pattern relationships or data maps relating to the vehicle running speed and throttle valve opening are used to control the automatic transmission, or alternatively the detected running conditions of the vehicle are adjusted or compensated depending upon the desired modes of operation of the vehicle, in determining the next selected position of the transmission. According to these conventional systems, the driver's intention is only indirectly estimated, or reflected on the selected position of the transmission. Namely, the conventional manner of controlling the transmission is based on the assumption that the predetermined shift pattern data maps generally incorporate the driver's intention or requirement.

As described above by reference to the graph of FIG. 22, the shift-down action of the transmission from the 4th-speed position to the 3rd-speed position exemplified in the graph is not required by the driver or is not directly commanded by the driver, who depressed the accelerator pedal to increase the throttle opening from $\theta 1$ to $\theta 2$ while the vehicle running speed is n1. The relevant shift-down action is determined based on the shift pattern relationships which are predetermined by selected running conditions of the vehicle. According to the predetermined relationships, the driver's intention of increasing the throttle opening as indicated above is satisfied to the highest degree if the transmission is shifted down from the 4th-speed position to the 3rd-speed position.

Generally, the driver's intention may be relatively accurately estimated, where the number of the operating conditions of the vehicle used to estimate the driver's intention is relatively small. For example, where only the two conditions, i.e., vehicle speed and throttle opening are used for the shift pattern relationships or data maps, the estimation of the driver's intention following the data maps is rather reliable and accurate However, if the control arrangement for the transmission is adapted to modify or adjust the data maps depending upon the other running conditions or modes of operation of the vehicle, it is considerably difficult to maintain a well matched state between the actual vehicle running conditions and the driver's intention or requirement.

The drawback is derived from the determination of the shifting positions of the transmission, which is effected based on the shift pattern relationships or data maps that merely indirectly reflect the driver's intention or requirement, in the sensor described above.

In the control method of the present invention for a vehicle automatic transmission described above, the automatic transmission is controlled according to the control rules which directly determine the driver's requirement or requirements (associated with the selection of the operating positions of the transmission), while utilizing the knowledge of engineering or artificial intelligence technology wherein intellectual activities of men for processing information are realized by a computer. Each of the control rules consists of two or more sub-rules which relate to selected operating conditions of the vehicle effected to determine the optimum position of the transmission to be selected next. The decision as to whether the control rule is satisfied or not, that is, the decision as to whether the transmission is shifted to the position corresponding to that control rule, is effected by solving the corresponding equation by a logical operation based on the results of determinations of the sub-rules. According to the instant arrangement, the driver's requirement or intention is directly reflected by the determination on the selected optimum position of the transmission according to the control rules. The operating conditions of the vehicle used as control parameters for the determination may be given suitable weights depending upon the particulars of the sub-rules and the logical equations, so that the determined or selected position of the transmission is the optimum or most desired position to which the transmission is shifted under the vehicle conditions some of which are established by the driver's intention. Thus, the optimum position of the transmission is selected such that the driver's requirement may be most satisfied, with the vehicle conditions taken as a whole.

In one form of the invention, each control rule includes at least a sub-rule for selecting the operating position of the transmission in which the actual engine speed is maintained at or near a desired engine speed, so as to provide a desired vehicle drive torque corresponding to an amount of operation of an accelerator pedal of the vehicle.

In another form of the invention, the plurality of control rules includes a control rule for maintaining the currently selected position of the transmission, a control rule for shifting up the transmission, and a control rule for shifting down the transmission.

The automatic transmission may preferably be operatively connected to the engine through a lock-up clutch interposed therebetween. In this case, the control rules may include a control rule for determining whether the lock-up clutch is brought to its engaged position or not, depending upon sub-rules associated with suitable conditions of the vehicle.

In a further form of the invention, the logical operations according to the logical equations may be executed following the fuzzy set theory, such that the degrees of satisfaction of the control rules are calculated, in the form of a continuously variable value between a logical "1" which means perfect satisfaction of the control rule, and a logical "0" which means perfect dissatisfaction of the control rule.

The second object described above may be achieved according to another aspect of the invention, which provides an apparatus for controlling an automatic transmission for a motor vehicle having a plurality of operating positions such that the operating positions are automatically selected, comprising: memory means for storing a plurality of control rules and a plurality of logical equations which correspond to the operating positions of the transmission, each of the control rules consisting of a plurality of sub-rules for effecting determinations associated with running conditions of the motor vehicle; determining means for effecting a logical operation of each control rule according to a corresponding one of the logical equations, based on results of the determinations of the sub-rules corresponding to the relevant control rule, and making a decision as to whether each control rule is satisfied, or not; and shifting means for effecting a shifting action of the transmission to select one of the operating positions which corresponds to the control rule which is satisfied.

The control apparatus for the automatic transmission according to the invention offers the same advantages as described above with respect to the control method of the invention. The apparatus may be adapted to utilize the fuzzy set theory for performing the logical operations according to the logical equations, as described above.

BRIEF DESCRIPTION OF THE DRAWINGS

The foregoing and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
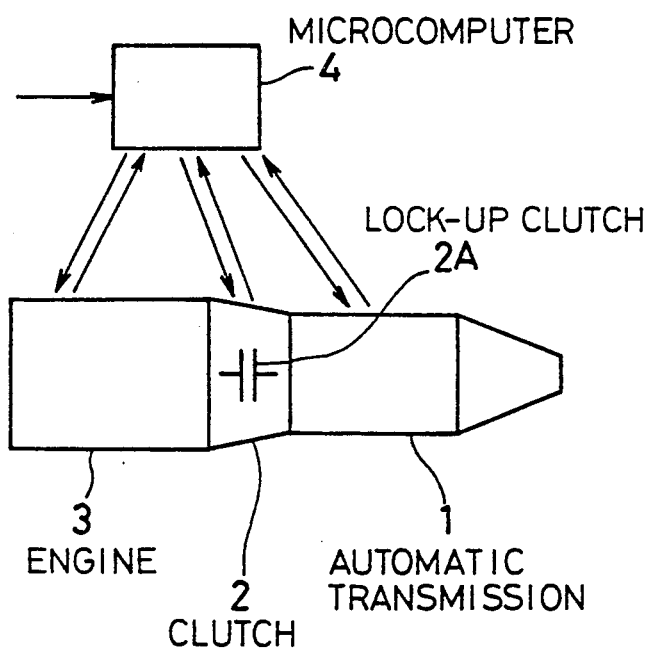
FIG. 1 is a schematic view showing a part of an automotive vehicle, which incorporates one embodiment of the present invention including a microcomputer for controlling an automatic transmission operatively connected to an engine.
Figure 2:
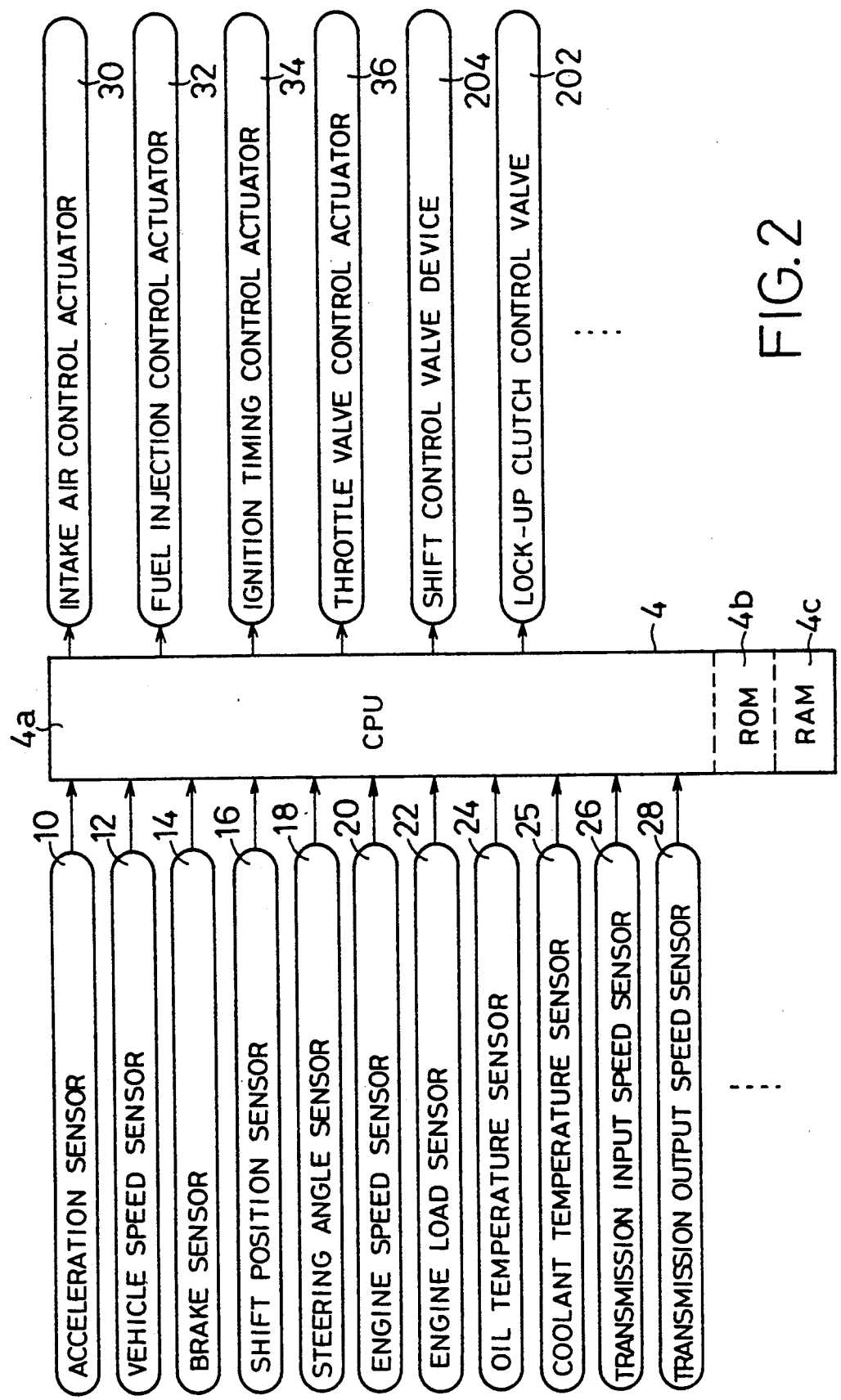
FIG. 2 is a block diagram illustrating the microcomputer, and various devices which produce signals applied to the microcomputer or receive output signals from the microcomputer.
Figure 3:
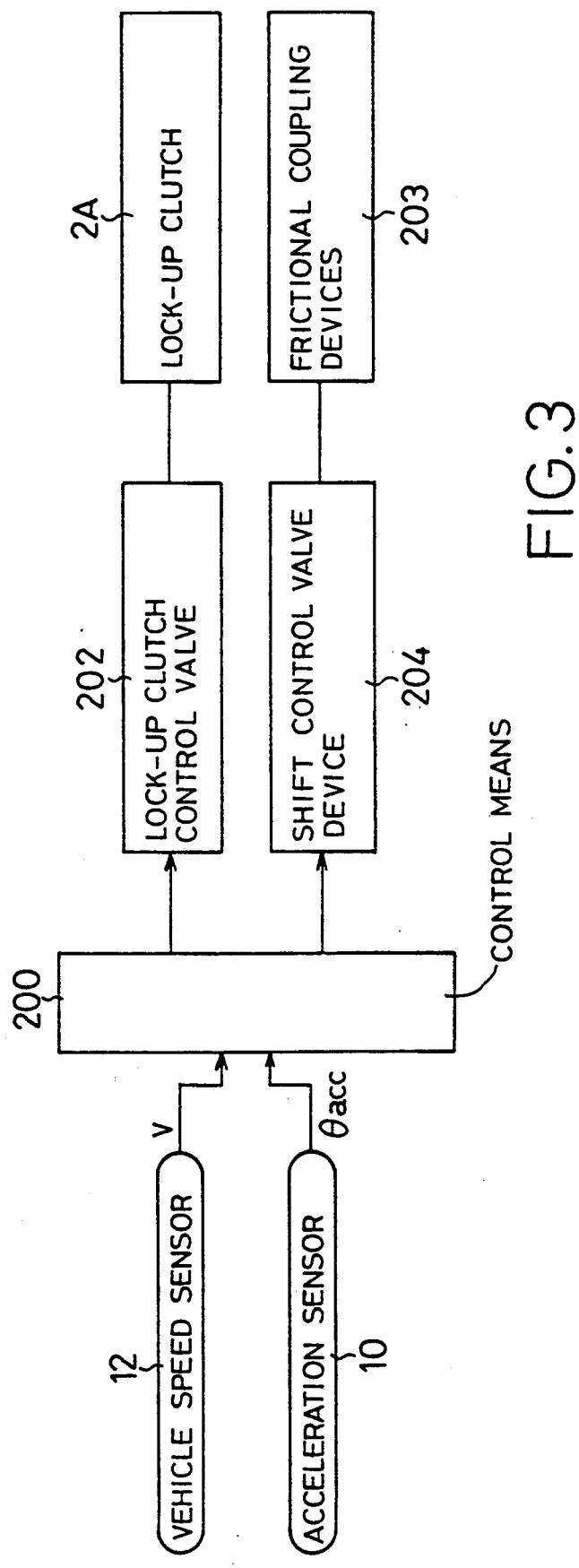
FIG. 3 is a schematic block diagram illustrating a control arrangement for controlling a lock-up clutch control valve and a shift control valve device.

Referring first to FIGS. 1-3, there is illustrated by way of example a general arrangement of a control apparatus for an automatic transmission 1 for a motor vehicle. The automatic transmission 1 has a plurality of operating positions, and is connected through a clutch 2 to an engine 3. While the clutch 2 and the engine 3 as well as the automatic transmission 1 are controlled by a microcomputer 4, major components to be controlled by the microcomputer 4 according to the principle of the present invention are a plurality of valves of a shift control valve device 204 (FIGS. 2 and 3) incorporated in the automatic transmission 1. The valves of the shift control valve device 204 are electromagnetically operated under the control of the microcomputer 1, to regulate supply and discharge flows of a working fluid to and from suitable combinations of a plurality of frictional coupling devices 203, for selectively establishing the operating positions of the automatic transmission 1.

After the appropriate position of the automatic transmission 1 has been determined according to the present invention, the automatic transmission 1 is shifted to the determined or selected position, by a suitable mechanism in a manner well known in the art.

For instance, the automatic transmission 1 uses a planetary gear mechanism combined with the frictional coupling devices 203, or a conventional manual transmission gear mechanism combined with the coupling devices 203 for automatic shifting operations of the transmission. However, the mechanism for shifting the automatic transmission 1 by means of the shift control valve device 204 and the frictional coupling devices 203 is not limited to a specific type, but may be constituted by any one of the conventionally used arrangements for automatic transmission systems for motor vehicles.

The clutch 2 is provided for selective operative connection and disconnection between the automatic transmission 1 and the engine 3. In the illustrated power transmission system, the clutch 2 is a torque converter equipped with a lock-up clutch 2A. It is preferable that the lock-up clutch 2A is controlled by a lock-up clutch control valve 202 (FIGS. 2 and 3) in relation to the operation of the automatic transmission 1 according to the invention. The clutch 2 may be an electromagnetic powder clutch or any other electrically operated clutch, and can therefore be controlled by the microcomputer 4. However, the manner of controlling the clutch 2 is not essential to practice the principle of the invention. The clutch 2 may also be a fluid clutch.

The engine 3 may also be controlled in relation to the selected position of the automatic transmission 1. But, this arrangement is not essential to the present invention.

It will be understood that the microcomputer 4 may be used to control a suspension system, a 4-wheel steering system, a 4-wheel drive system, a wheel traction control system, a brake system, and other systems of the vehicle, as well as and in relation to the operation of the automatic transmission 1.

As indicated in FIG. 2, the microcomputer 4 includes a central processing unit (CPU) 4a, a read-only memory (ROM) 4b, and a random-access memory (RAM) 4c. The CPU 4a operates according to various control programs stored in the ROM 4b, while utilizing a temporary data storage function of the RAM 4c. The control programs stored in the ROM 4b include programs for controlling the transmission 1, as described below in greater detail. The CPU 4a receives output signals of various sensors including: an acceleration sensor 10 for detecting an angle of operation of an accelerator pedal; a vehicle speed sensor 12 for detecting the vehicle running speed; a brake sensor 14 for detecting an operation of a brake pedal; a shift position sensor 16 for detecting a currently selected position of a shift lever for the transmission 1; a steering angle sensor 18 for detecting the steering angle of the vehicle; an engine speed sensor 20 for detecting the speed of the engine 3; an engine load sensor 22 for detecting an opening of a throttle valve, a pressure in an intake manifold of the engine 3, or a rate of flow of an intake air supplied to the engine 3, or other parameters indicative of the load of the engine 3; an oil temperature sensor 24 for detecting the temperature of the lubrication oil in the transmission 1; a coolant temperature sensor 25 for detecting the temperature of the cooling water for the engine 3; a speed sensor 26 for detecting the input shaft speed of the transmission 1; and a speed sensor 28 for detecting the output shaft speed of the transmission 1.

The CPU 4a of the microcomputer 4 may be adapted to receive signals from other sensors such as sensors for detecting the road surface gradient, vehicle load, wheel speed or speeds, drive axle torque, vehicle acceleration, pressures in wheel tires, and friction coefficient of the road surface. However, these sensors are not essential to the present invention.

The CPU 4a produces output signals for controlling the lock-up clutch control valve 202 and the shift control valve device 204, as described above. Further, the CPU 4a produces signals for controlling an intake air control actuator 30, a fuel injection control actuator 32, an ignition timing control actuator 34, and a throttle valve control actuator 36. However, the lock-up clutch control valve 202, and the actuators 30-36 are not essential to the present invention.

The arrangement for controlling the lock-up clutch 2A of the clutch (torque converter) 2, and the frictional coupling devices 203 of the transmission 1 is schematically illustrated in FIG. 3.

Figure 22:
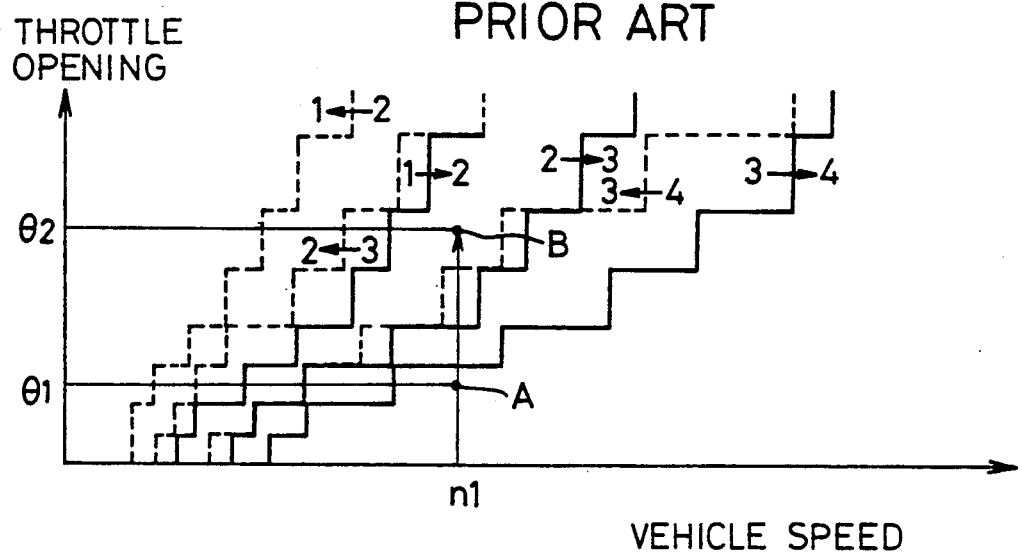
FIG. 22 is a diagram illustrating a known manner of determining the transmission shift position, from predetermined shift pattern relationships between the throttle opening and the vehicle speed.

Block 200 in FIG. 3 designates control means of the microcomputer 4 which applies control signals to the lock-up clutch control valve 202 and the shift control valve device 204, according to the received signals such as the signals from the sensors 12 and 10, which are indicative of the vehicle speed V and the operation angle $\theta$acc of the accelerator pedal. In the conventional method, the shift control valve device 204 is controlled based on the predetermined shift pattern relationships as described above by reference to FIG. 22. In the present embodiment, the valve device 204 is controlled according to logical operations based on control rules which are represented by the control program stored in the ROM 4b of the microcomputer 4.

The lock-up clutch control valve 202 and the shift control valve device 204 are constructed as well known in the art. While only the sensors 12, 10 are shown in FIG. 3, the first control means 200 of the microcomputer 4 receives the signals from the other sensor, as needed.

Figure 4:
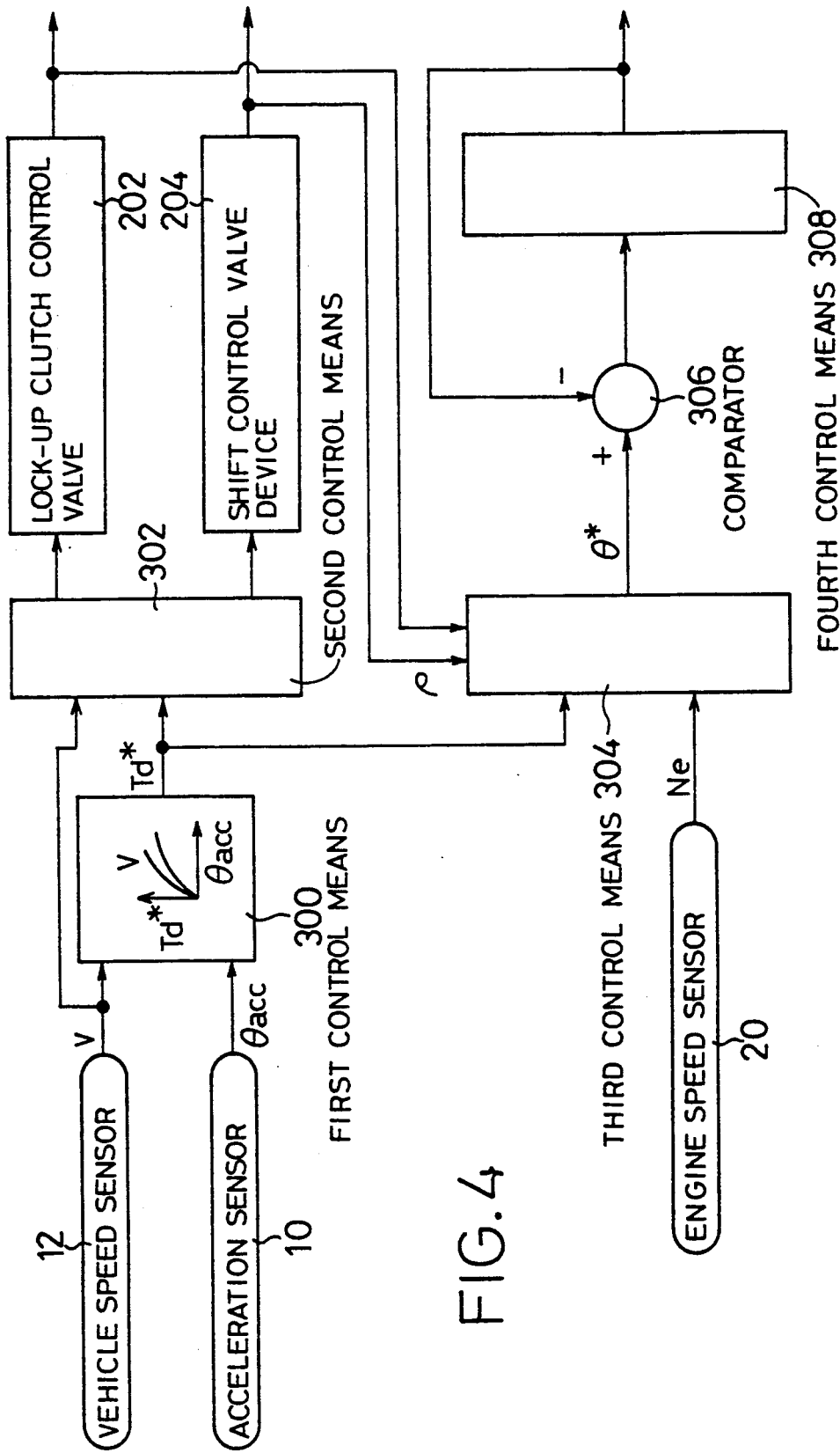
FIG. 4 is a schematic block diagram illustrating a modified control arrangement for controlling the lock-up clutch control valve, the shift control valve device, and a throttle valve control actuator.

An arrangement shown in FIG. 4 is a development of the arrangement of FIG. 3. In this modified arrangement, the throttle valve (whose opening determines the engine output) of the engine 1 as well as the transmission 1 and lock-up clutch 2A is controlled. Generally, the output of an engine of a motor vehicle is controlled in an open-loop manner by changing the opening of a throttle valve which is linked with an accelerator pedal. However, such an open-loop control of the throttle valve through the accelerator pedal does not accurately reflect the driver's requirement in connection with the operating conditions of the engine and automatic transmission. Stated more particularly, when the driver depresses the accelerator pedal, the driver desires to accelerate the vehicle. A typical physical quantity or parameter that accurately reflects the driver's requirement or desire is considered to be a desired drive torque Td* by which the vehicle is driven. In this respect, it is preferred to determine the driver's desired vehicle drive torque Td* by an amount of operation of the accelerator pedal, and control the opening of the throttle valve by regulating a throttle valve actuator so as to meet the determined desired vehicle drive torque Td*. In this case, the throttle valve is not linked with the accelerator pedal, but is linked with the throttle actuator.

Figure 6:
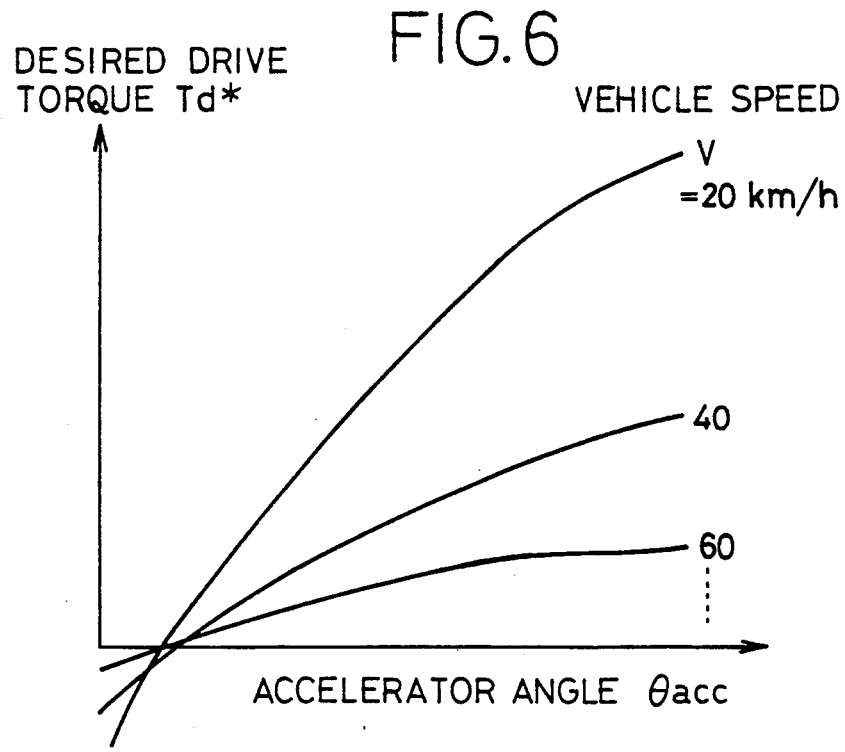
FIG. 6 is a graph indicating relationships between a target or desired vehicle drive torque and an operation angle of an accelerator pedal.

An example of a control arrangement following the above concept is illustrated in FIG. 4, wherein block 300 designates first control means of the microcomputer 4, which obtains the desired vehicle drive torque Td* by the vehicle speed V and the operation angle $\theta$acc of the accelerator pedal, according to a predetermined relationship stored in the ROM 4b or by means of calculation. An example of the relationship for determining the desired vehicle drive torque Td* is shown by the graph of FIG. 6.

Block 302 designates second control means of the microcomputer 4, which produces control signals applied to the lock-up clutch control valve 202 and shift control valve device 204, according to the determined desired vehicle drive torque Td* and the detected vehicle speed V. It will be understood that the other parameters detected by the sensors other than the acceleration sensor 10 and vehicle speed sensor 12 may be used by the second control means 302 to apply the control signals to the valve 202 and valve device 204.

The control signal applied to the shift control valve device 204 to select the optimum operating position of the automatic transmission 1 is determined by logical operations according to control rules depending upon various conditions of the vehicle, as described below in detail.

Block 304 denotes third control means of the microcomputer 4, which produces a signal indicative of a desired opening $\theta$* of the throttle valve, according to the determined desired vehicle drive torque Td*, the engine speed Ne detected by the engine speed sensor 20, a gear ratio $\rho$ of the automatic transmission 1, a signal indicative of the engagement or disengagement of the lock-up clutch 2A, and other suitable parameters. The desired throttle opening $\theta$* is determined so as to provide the determined desired vehicle drive torque Td*. More specifically, a torque Te of the engine 3 may be obtained by dividing the desired vehicle drive torque Td* by the gear ratio $\rho$, while the lock-up clutch 2A is engaged. The desired throttle opening $\theta$* to provide a certain amount of the engine torque Te at the engine speed Ne can be determined by the known output characteristic of the engine 3. In other words, the desired throttle opening $\theta$* can be determined by the desired vehicle drive torque Td*. While the lock-up clutch 2A is not engaged, a slip ratio of the lock-up clutch 2A should be taken into account in determining the desired throttle opening $\theta$*.

The signal indicative of the desired throttle opening $\theta$* is applied to a comparator 306, which compares the desired value $\theta$* with the actual throttle opening $\theta$, to obtain an error of the actual value from the commanded desired value.

Block 308 denotes fourth control means of the microcomputer 4, which controls the throttle actuator 36, so as to zero the error between the desired and actual throttle opening values $\theta$* and $\theta$, in a closed-loop manner.

The arrangement of FIG. 4 permits the driver's desire or intension to be accurately reflected by the desired vehicle drive torque Td*. To this end, the throttle actuator 36 is controlled independently of the accelerator pedal, in order to control the throttle valve to thereby control the operating state of the engine 1.

In connection with the preferred embodiment of FIG. 4, it is noted that the principle of the present invention may be practiced by the embodiment of FIG. 3 which does not incorporate a feedback system in which the actual engine output is controlled by the throttle actuator 36, in response to the determined desired vehicle drive torque Td* and desired throttle opening $\theta$*.

Like the control means 200 of the embodiment of FIG. 3, the first control means 300 may be adapted to receive signals other than V and $\theta$acc. Further, the signal V may be differentiated so that the differentiated value is applied to the first control means 300, and/or the signal $\theta$acc may be converted into a signal indicative of a rate of change in the acceleration angle $\theta$acc so that the latter signal is applied to the control means 300.

Figure 5:
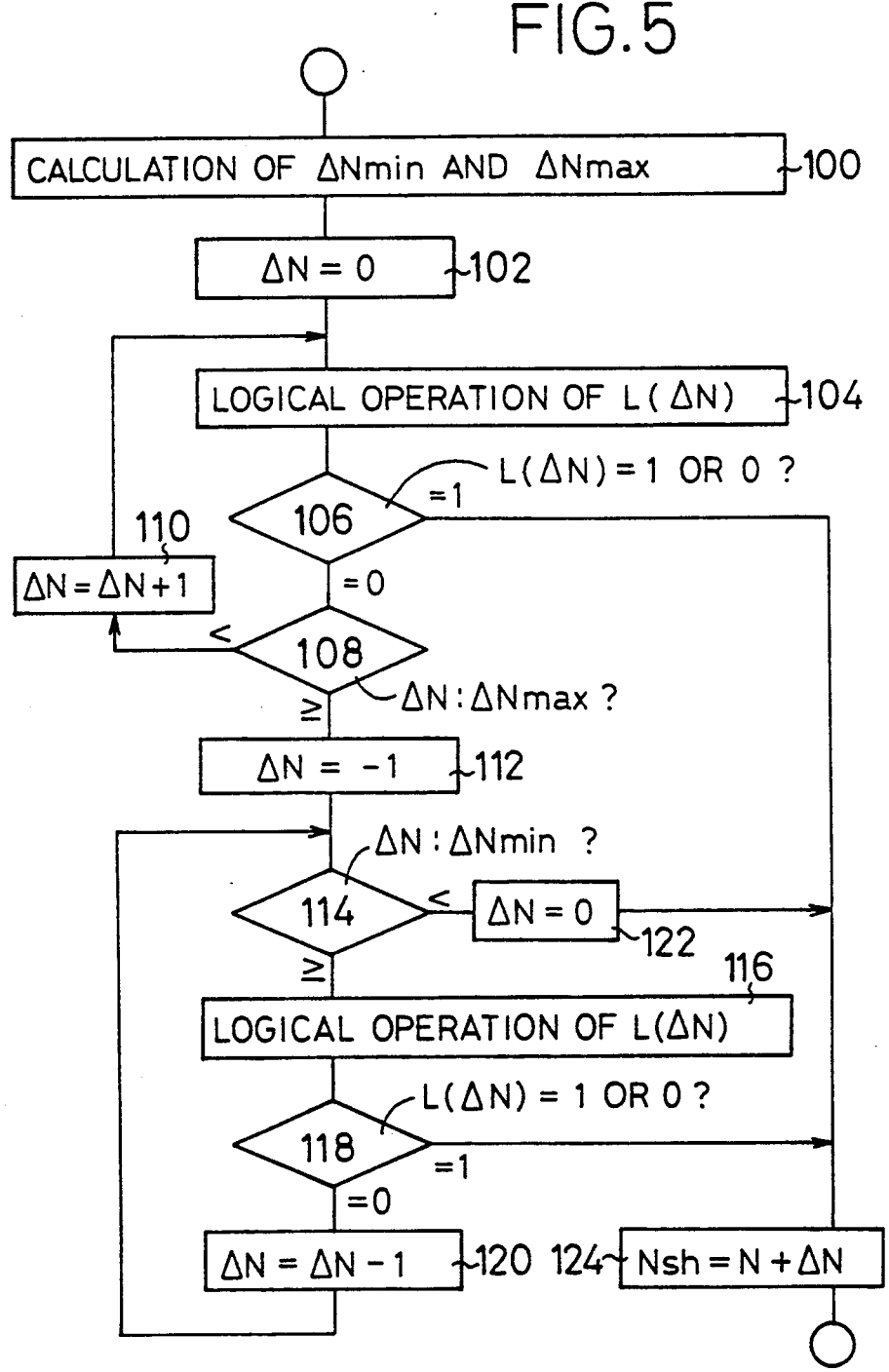
FIG. 5 is a flow chart showing a control program executed by the microcomputer.

Referring next to FIG. 5, there will be described the control routine or program executed by the control means 200 of FIG. 3 or second control means 302 of FIG. 4, to selectively establish the operating positions of the automatic transmission 1, according to the appropriate control rules.

In the flow chart of FIG. 5, N represents the currently selected position of the automatic transmission 1, and $\Delta$N is a variable corresponding to the number of the positions as counted from the currently selected position to the newly selected optimum position Nsh to which the transmission 1 is shifted according to the principle of the invention. Namely, $Nsh = N + \Delta N$. If the transmission 1 has four operating positions (e.g., 1st-speed, 2nd-speed, 3rd-speed and 4th-speed gear positions), $\Delta N$ is equal to "1" if the transmission 1 is shifted up from the 2nd-speed position (N=2) to the 3rd-speed position (Nsh=3), and $\Delta N$ is equal to "−2" if the transmission 1 is shifted down from the 4th-speed position (N=4) to the 2nd-speed position (Nsh=2).

The process steps of the control routine of FIG. 5 will be described, assuming the transmission 1 has the four positions described above:

STEP 100

A permissible minimum value $\Delta Nmin$ and a permissible maximum value $\Delta Nmax$ of $\Delta N$ are determined in this first step 100. Suppose the transmission 1 is currently placed in the 2nd-speed position (N=2), for example, the minimum value $\Delta Nmin$ is equal to "−1" while the maximum value $\Delta Nmax$ is equal to "2".

STEP 102

$\Delta N$ is set to zero to maintain the currently selected position of the transmission 1, before determining whether to shift up or down the transmission.

STEP 104

This step is executed to effect a determination by logical operation as described below, as to whether a control rule $L(\Delta N)$ is satisfied, or not, where the value Nsh is $N + \Delta N$. A logical value "1" is obtained if the control rule is satisfied, and a logical value "0" is obtained if the control rule is not satisfied.

STEP 106

This step is executed to determine whether the logical value of the control rule $L(\Delta N)$ is "1" or "0". If the logical value is "1", step 124 is implemented to set the value Nsh to $(N + \Delta N)$, and the control routine is terminated. If the logical value is "0", step 106 is followed by step 108.

If the logical value of $L(\Delta N)$ is found to be "1", this means that the value $\Delta N$ which determines the next selected position of the transmission 1 is adequate, whereby the next selected position Nsh is set to $(N + \Delta N)$ in step 124. However, since the value $\Delta N$ is initially set to "0" in step 102, the currently selected position is maintained because the value Nsh is equal to $(N + 0)$. Namely, no shifting action of the transmission 1 will take place in step 124 in this case.

If the logical value of the control rule $L(\Delta N)$ is "0", this means that the currently established value $\Delta N$ is not adequate. In this case, step 108 is executed to find the optimum value $\Delta N$, i.e., optimum position to which the transmission 1 is shifted.

STEP 108

If the current value $\Delta N$ is equal to (or larger than) $\Delta Nmax$, step 112 is executed. If the value $\Delta N$ is smaller than $\Delta Nmax$, step 110 is executed.

STEP 110

The value $\Delta N$ is incremented. Then, the control flow goes back to step 104.

Consequently, the determination in step 106 is made, with respect to the incremented value $\Delta N$. If the logical value of the control rule $L(\Delta N)$ is "1", the value Nsh is set to $(N + 1)$ in step 124. That is, the second control means 302 produces a signal indicative of the optimum position Nsh $(N + 1)$ which is one position higher than the currently selected position "N".

As described above, the determination as to the logical value of the control rule $L(\Delta N)$ is accomplished by repeating steps 104, 106, 108, 110 with the value $\Delta N$ being incremented for each execution of these steps. When the logical value "1" is obtained in step 106 during the repeated execution of steps 104–110, step 106 is followed by step 124 so that the position Nsh of the transmission 1 to be selected next is determined. If the control rule is not satisfied (if the logical value "0" is maintained) even after the value $\Delta N$ reaches the maximum value $\Delta Nmax$, the control flow goes to step 112 and the subsequent steps, in order to effect the determination of the control rule, in connection with a shift-down action of the transmission 1.

STEP 112

The value $\Delta N$ is set to "−1".

STEP 114

If the value $\Delta N$ is smaller than the minimum value $\Delta Nmin$, the control flow goes to step 122. If the value $\Delta N$ is equal to (or larger than) the minimum value $\Delta Nmin$, the control flow goes to step 116.

STEP 116

A determination similar to that in step 104 is achieved.

STEP 118

If the logical value of the control rule $L(\Delta N)$ is "1", step 124 is executed to set the value Nsh to $(N + \Delta N)$, i.e., $(N − 1)$, whereby the second control means 302 produces a signal indicative of the next selected position Nsh which is one position lower than the currently selected position N. The control routine is then terminated. If the logical value is "0", step 120 is executed.

STEP 120

The value $\Delta N$ is decremented, and the control flow goes to step 114, so that steps 114, 116, 118, 120 are repeatedly executed.

STEP 122

This step is executed where the control rule is not satisfied with respect to any values $\Delta N$ other than zero. In this step, the value $\Delta N$ is set to zero. Generally, the logical value of the control rule $L(\Delta N)$ becomes equal to "1" while the value $\Delta N$ is incremented or decremented in step 110 or 120, and the control flow goes to step 122 with a very low possibility. However, it is possible that the control rule is not satisfied with respect to any values $\Delta N$ (except zero). In this case, the value $\Delta N$ is set to zero, so that the currently selected position of the transmission 1 is maintained.

STEP 124

The value Nsh is set to $(N + \Delta N)$. Namely, the position Nsh of the transmission 1 to be selected next is determined.

According to the control routine of FIG. 5, the determination of the control rule is first made with respect to the currently established position N. If the determination indicates that the control rule is satisfied with the current position N, then the second control means 302 makes a determination to maintain the current position N, and the control routine is terminated.

If the control rule is not satisfied with respect to the currently established position N of the automatic transmission 1, the determination of the control rule is made by incrementing the value $\Delta N$, i.e., with respect to the position or positions which is/are higher than the current position N. When the control rule is satisfied with respect to a certain value $\Delta N$ while the value is incremented, the position Nsh to be selected next is determined to be $(N+\Delta N)$.

If the control rule is not satisfied with respect to any positive values $\Delta N$, the determination of the control rule is effected as to the negative values $\Delta N$ by decrementing the current value $\Delta N$.

If the control rule is satisfied with respect to neither the current position N ($\Delta N=0$), nor the positive or negative values $\Delta N$ (any positions to which the transmission 1 is shifted up or down), then the current position is maintained as a result of execution of step 122.

After the second control means 302 determines the position Nsh ($=N+\Delta N$) in step 124, the corresponding signal is applied to the shift control valve device 204, so that the determined position Nsh of the transmission 1 is newly established by means of the frictional coupling devices 203. It will be understood that the ROM 4b of the microcomputer 4 serves as memory means for storing data representative of the control program of FIG. 5 including the control rule, and a portion of the second control means 302 of the microcomputer 4 which executes steps 104 and 116 serves as means for effecting a determination as to whether the control rule is satisfied with respect to a varying values of $\Delta N$. Further, the shift control valve device 204 functions as shifting means for shifting the automatic transmission 1 from the current position N to the newly selected position Nsh.

Now, the manner of effecting the logical operation of the control rule $L(\Delta N)$ in steps 104 and 116 will be described in detail.

While the description of the control routine of FIG. 5 has referred to the "control rule" in general in the interest of simplification, the control rule changes with the value $\Delta N$ ($N=0, 1, 2, 3, 4$ in the illustrated example), as discussed below.

(1) Current-Position Holding Control Rule Where $\Delta N=0$

This control rule that should be satisfied to maintain the currently selected position N of the transmission 1 ($\Delta N=0$) has the following three sub-rules A, B and C:

SUB-RULE A

Possible to provide desired vehicle drive torque Td* in the current position N

The manner of obtaining the desired vehicle drive torque Td* has been explained above. Suppose the transmission 1 is placed in the 2nd-speed position ($N=2$), a maximum value of torque of the engine 3 with the transmission placed in the 2nd-speed position can be approximated from the known characteristic of the engine 3. If this maximum torque is larger than the desired vehicle drive torque Td*, it is considered that the desired vehicle drive torque Td* can be provided with the transmission 1 placed in the current 2nd-speed position. The sub-rule A of the current-position holding control rule is to determine whether an inequality $C1 \leq Td^* \leq C2$ is satisfied or not. If this inequality is satisfied, the logical value of the sub-rule A is equal to "1", i.e., the sub-rule A is satisfied. If the inequality is not satisfied, the logical value of the sub-rule A is equal to "0", i.e., the sub-rule A is not satisfied.

In the inequality indicated above, threshold values C1 and C2 are respectively a minimum and a maximum value of the vehicle drive torque where the transmission 1 is placed in the desired position Nsh, that is, in the currently established position N in this case (Nsh=N according to the sub-rule A). These threshold values C1 and C2 are predetermined by calculation or based on experimental data and stored in the ROM 4b of the microcomputer 4. Generally, the threshold values C1, C2 are expressed as a function of the gear ratio $\rho$ and vehicle speed V which are detected in the currently established position N of the transmission 1. In the case where the values C1, C2 are obtained by calculation, the calculation is made based on the maximum engine torque, characteristics of the clutch 2, gear ratio p of the transmission 1, and other factors, in the current position N of the transmission 1.

SUB-RULE B

Actual engine speed Ne close to desired engine speed Ne*

If the desired vehicle drive torque Td* is relatively small, for example, this torque Td* may be provided with the transmission 1 placed in any one of the four positions ($N=1, 2, 3$ or $4$). Therefore, it is necessary to select the most optimum position. For this purpose, the sub-rule B is provided. The sub-rule B is to determine whether an inequality $C3 \leq Ne \leq C4$ is satisfied or not. If this inequality is satisfied, the logical value of the sub-rule B is equal to "1". If not, the logical value is equal to "0".

The threshold values C3 and C4 define a range of the desired engine speed Ne*, and are predetermined with various factors such as the fuel economy and noise level of the engine 3 taken into account. Generally, the threshold values C3, C4 are expressed as a function of the vehicle speed V and desired vehicle drive torque Td*.

SUB-RULE C

Actual engine speed Ne within a permissible range

This sub-rule C is provided to protect the engine 3 against abnormal or undesired operating conditions. More specifically, the engine 3 may stall if the engine speed is too low, and may be overrun if the engine speed is too high. To avoid these conditions or to hold the engine speed Ne within a normal or safe-running range, the sub-rule C is provided to determine whether an inequality $C5 \leq Ne \leq C6$ is satisfied or not. If this inequality is satisfied, the logical value of this sub-rule C is equal to "1". If not, the logical value is equal to "0". The threshold values C5 and C6 are predetermined with the characteristics of the engine 3 taken into consideration.

After the logical values of the sub-rules A, B and C have been obtained as described above, the logical value of the current-position holding control rule $L(\Delta N)$ with respect to the currently established position $N(\Delta N=0)$ is determined or calculated according to the following logical equation (i):

$$L(\Delta N=0)=A \cdot B \cdot C \tag{i}$$

In the equation (i), "·" represents logical multiplication or AND operation to obtain a logical product. Therefore, the logical value of the current-position holding control rule is "1" only when the logical value of all the sub-rules A, B and C is equal to "1".

(2) First Shift-up Control Rule Where ΔN= +1

The first shift-up control rule that should be satisfied to shift up the transmission 1 to the next higher position (Nsh=N+1) has the following seven sub-rules A, B, C, D, E, F and G:

SUB-RULE A

Possible to provide the desired vehicle drive torque Td* in the position (N+1)

The principle of this sub-rule A is similar to that of the sub-rule A of the current-position holding control rule (1) described above.

SUB-RULE B'

Actual engine speed Ne close to desired engine speed Ne*

The principle of this sub-rule B' is similar to that of the sub-rule B of the control rule (1). However, threshold values C3' and C4' are used in place of C3 and C4. The engine speed range defined by (C3'−C4') is slightly narrower than the range defined by (C3−C4). If the current position N is maintained with the control rule (1) satisfied as described above, a slight amount of deviation of the actual engine speed Ne from the desired engine speed Ne* does not matter. However, it is desirable that the actual engine speed Ne approach the desired engine speed Ne*, as long as a shifting operation of the transmission 1 takes place. That is, the transmission 1 should be shifted to the position that permits the actual engine speed Ne to come closer to the desired engine speed Ne*.

SUB-RULE C

Actual engine speed Ne within a permissible range

The principle of this sub-rule C is similar to that of the control rule (1).

SUB-RULE D

Accelerator pedal kept at a same position

The sub-rule D is to determine whether a rate dθacc/dt at which the operation angle dθacc of the accelerator pedal is changed is held within a range between threshold values C8 and C9.

The threshold value C9 used in the sub-rule D for ΔN= +1 is relatively a small value. That is, the accelerator pedal is kept at a substantially same position if the sub-rule D is satisfied. A significance of this sub-rule D is based on the basic principle that the transmission 1 is rather positively shifted up or down when the driver operates (depresses) the accelerator pedal to an appreciable extent, in order to meet the driver's intention of the pedal operation, but a shifting operation of the transmission 1 is rather inhibited if an appreciable amount of operation of the accelerator pedal is not detected. As is apparent from the flow chart of FIG. 5, the logical operation of the control rule is first executed with respect to the current position N of the transmission 1, and then executed to the next higher position (N+1). As far as the current accelerator pedal position is substantially maintained, the logical value of the sub-rule D becomes equal to "1" when the logical determination of the first shift-up control (2) is executed with respect to the next higher position (N+1). Namely, the control rule (2) is satisfied so that the transmission 1 is shifted up to the next higher position (N+1), but not to the position (N+2) or (N+3).

SUB-RULE E

Long time lapse after the last shifting action of transmission 1

This sub-rule E is provided to avoid frequent shifting actions of the transmission 1 at excessively short time intervals. Generally, a relatively early shift-up operation of an automatic transmission is preferred in terms of the fuel economy and reduction in the noise level of an engine. On the other hand, excessively frequent shifting operations of the transmission is not desirable from the standpoint of driving comfort of the vehicle. Further, a higher degree of drivability of the vehicle is provided in many cases by maintaining the currently established position of the transmission, rather than shifting up the transmission. In view of the above, the sub-rule E is provided to permit a shifting action of the transmission 1 to the next higher position (N+1) only when the time lapse Tbs after the last shifting action exceeds a threshold value C10. Therefore, while the time lapse Tbs is shorter than the threshold value C10, the logical value of the sub-rule E remains "0", and the first shift-up control rule (2) is not satisfied. Accordingly, the transmission is kept in the current position N in step 122 of the control routine of FIG. 5, until the time lapse Tbs exceeds the predetermined threshold C10.

SUB-RULE F

Accelerator pedal release

The transmission 1 is shifted up when the accelerator pedal is released, as well as when the accelerator pedal is depressed. The sub-rule F is to determine whether the rate dθacc/dt at which the accelerator pedal is operated (released) is smaller than a threshold value C11. If an affirmative determination is obtained, the logical value of the sub-rule F is "1". If a negative determination is obtained, the logical value is "0".

SUB-RULE G

Vehicle not running on a curved road

The vehicle driver tends to release the accelerator pedal when the vehicle turns along a curve. If the transmission 1 is shifted up upon releasing of the accelerator pedal, the transmission 1 must be shifted down to accelerate the vehicle after the vehicle has left the curve. To avoid a shift-up operation of the transmission 1 in the above condition, the sub-rule G is provided. The sub-rule G is to determine whether the absolute value of the steering angle θs detected by the steering angle sensor 18 is smaller than a threshold value C12. If the absolute value of the steering angle θs is smaller than the threshold value C12, the logical value of the sub-rule G is "1". If the absolute value is larger than the value C12, the logical value of the sub-rule G is "0".

The logical value of the first shift-up control rule (2) is determined according to the following logical equation (ii):

$$L(\Delta N=1)=A \cdot B' \cdot C \cdot \{(D \cdot E)+F \cdot G\} \tag{ii}$$

The $\{(D \cdot E)+F \cdot G\}$ signifies that the logical value of the sub-rules D, E, F and G is "1" if either (D E) or (F ·G) is satisfied. Namely, the logical "1" of the sub-rules D, E, F and G is obtained if the rate of depression of the accelerator pedal is substantially constant (sub-rule D satisfied) and the time lapse Tbs from the last shifting action exceeds the predetermined value (sub-rule E satisfied), or if the accelerator pedal is released (sub-rule F satisfied) and the vehicle is not running along a curve (sub-rule G satisfied). Thus, "+" in the parenthesis {} represents a logical sum or inclusive-OR operation.

The logical "1" of the first shift-up control rule (2), i.e., $L(\Delta N+1)$, is obtained if the logical value of all the sub-rules A, B' and C is "1" and the logical value of {} is "1". In this case, the second control means 302 produces in step 124 a signal which is indicative of the position Ns (=N+1), which signal is applied to the shift control valve device 204.

(3) Second Shift-up Control Rule Where $\Delta N = +2, +3$

The second shift-up control rule (3) that should be satisfied to shift the transmission 1 to the position Nsh=(N+2) or (N+3) has the following five sub-rules A, B', C, F and G:

SUB-RULE A

Possible to provide desired vehicle drive torque Td*

The principle of this sub-rule A is similar to that of the sub-rule A of the current-position control rule (1).

SUB-RULE B'

Actual engine speed Ne close to desired engine speed Ne*

The principle of this sub-rule B' is similar to that of the sub-rule B' of the first shift-up control rule (2) described above.

SUB-RULE C

Actual engine speed Ne within a permissible range

The principle of this sub-rule C is similar to that of the sub-rule C of the control rule (1).

SUB-RULE F

Accelerator pedal release

The principle of this sub-rule F is similar to that of the sub-rule F of the first shift-up control rule (2).

SUB-RULE G

Vehicle not running along a curved road

The principle of this sub-rule G is similar to that of the control rule (2).

The situation in which the value $\Delta N$ is "+2" or larger occurs only where the accelerator pedal is released. In this respect, the sub-rules D and E used in the first shift-up control rule (2) are not used for the second shift-up control rule (3).

The logical value of the second shift-up control rule $L(\Delta N = +2)$ where $\Delta N = +2$ is determined according to the following logical equation (iii):

$$L(\Delta N= +2)=A \cdot B' \cdot C \cdot F \cdot G \qquad \text{(iii)}$$

Where the value $\Delta N$ is "+3", the threshold values are different from those where $\Delta N + 2$. Basically, the threshold values used for the sub-rules are determined in relation to the vehicle speed V, for each of the four positions Nsh to which the transmission 1 is shifted.

As described above, the control rules (1), (2) and (3) are provided for use where $\Delta N$ is 0, +1, +2 and +3 (in the case of the transmission 1 having the four operating positions (N=1, 2, 3, 4). If any one of the current-position holding control rule (1) and the first and second shift-up control rules (2) and (3) is not satisfied, the following shift-down control rule (4) is used to determine whether the transmission 1 is shifted down or not.

(4) Shift-down Control Rule Where $\Delta N = -1, -2, -3$

The shift-down control rule (4) that should be satisfied to shift down the transmission 1 to the position Nsh=(N−1), (N−2) or (N−3) has the following five sub-rules A, B', C, D and H:

SUB-RULE A

Possible to provide desired vehicle drive torque Td*

The principle of this sub-rule A is similar to that of the current-position holding control rule (1).

SUB-RULE B'

Actual engine speed Ne within desired engine speed Ne*

The principle of this sub-rule B' is similar to that of the sub-rule B' of the first shift-up control rule (2).

SUB-RULE C

Actual engine speed Ne within a permissible range

The principle of this sub-rule C is similar to that of the control rule (1).

SUB-RULE D

Accelerator pedal kept at a same position

The principle of this sub-rule D is similar to that of the first shift-up control rule (2). This sub-rule D is provided to shift down the transmission 1 when the vehicle is slowed down while the accelerator pedal is kept at a substantially same position (which includes the non-operated position in which the operation angle $\theta$acc is zero).

SUB-RULE H

Accelerator pedal depressed

This sub-rule is to determine whether the rate $d\theta$acc/dt at which the accelerator pedal is depressed is larger than a threshold value C13, or not. The logical value of this sub-rule H is "1" if the rate $d\theta$acc/dt is larger than the threshold value C13. If the rate is not larger than the value C13, the logical value "0" is obtained. The sub-rule H is provided to provide a kick-down shifting of the transmission 1 which occurs when the accelerator pedal is abruptly depressed.

The logical value of the shift-down control rule $L(\Delta N=-1)$ where $\Delta N=-1$ is determined according to the following logical equation (iv):

$$L(\Delta N = -1) = A \cdot B' \cdot C \cdot (D+H) \qquad \text{(iv)}$$

According to the above logical equation, the logical "1" is obtained to shift the transmission 1 to the next lower position Nsh (=N−1) where the rate of increase in the operation angle of the accelerator pedal is relatively low, since the desired vehicle drive torque Td* used in the sub-rule A varies with the speed of depression of the accelerator pedal (which satisfies the sub-rule H). If the desired vehicle drive torque Td* is relatively large, the shift-down control rule (4) is satisfied where ΔN = −2 or −3, whereby the two-step or three-step shift-down action of the transmission 1 will take place A shift-down operation of the transmission 1 may take place when the vehicle speed V is lowered while the accelerator pedal is placed in its non-operated position or a position near the non-operated position. In this case, the sub-rule D is satisfied. The value ΔN, i.e., the position Nsh to which the transmission 1 is shifted down is determined by the logical value of the sub-rule B', or the logical value of the sub-rule C (in particular, as to whether the engine speed Ne is higher than the lower limit of the permissible range, or not).

While the logical operations to determine the logical value of the control rules for shifting the transmission 1 has been described above, it is desirable that logical operations of similar control rules be performed to determine whether the lock-up clutch 2A of the clutch 2 (torque converter) is operated to its engaged or disengaged position Conventionally, a lock-up clutch provided between an automatic transmission and an engine is controlled based on predetermined transmission shift pattern relationships between the vehicle speed and the throttle valve opening Therefore, the operation to control the lock-up clutch has the same problem as encountered on the automatic transmission. In this respect, it is preferable to control the lock-up clutch 2A according to a control program shown in FIG. 7 by way of example only.

STEP 500

A logical operation of a lock-up clutch engaging control rule for engaging the lock-up clutch 2A is performed. If the logical value of this control rule is "1", the control rule is considered to be satisfied. If the logical value is "0", the control rule is not satisfied.

STEP 502

If the logical value of the control rule is "1", this step 502 is followed by step 504. If the logical value is "0", step 502 is followed by step 506.

STEP 504

The second control means 302 of the microcomputer 4 applies to the lock-up clutch control valve 202 a signal to place the lock-up clutch 2A in its engaged position.

STEP 506

The second control means 302 applies to the lock-up clutch control valve 202 a signal to place the lock-up clutch to its disengaged or released position.

There will be described an example of the manner of determining the logical value of the control rule for the lock-up clutch 2A in step 500. In the illustrated embodiment, the control rule for the clutch 2A has the following five sub-rules I–V:

SUB-RULE I

Engine speed Ne stabilized

This sub-rule I is to determine whether the engine speed Ne estimated when the lock-up clutch 2A is engaged is larger than a threshold value C20. If the estimated engine speed Ne is larger than the threshold value C20, the logical value "1" is obtained. If not, the logical value "0" is obtained.

The threshold value C20 is determined by calculation or stored data, with the characteristics of the engine 3 taken into account, and in relation to suitable parameters such as the engine load (such as the throttle opening) and the engine coolant temperature which are detected by the sensors 22, 25, respectively.

SUB-RULE II

Accelerator pedal depressed

The principle of this sub-rule II is similar to that of the sub-rule H of the shift-down control rule (4) discussed above.

SUB-RULE III

Accelerator pedal released

The principle of this sub-rule III is similar to that of the sub-rule F of the first shift-up control rule (2).

SUB-RULE IV

Vibrations less likely to be generated

A variation in the torque of the engine 3 will cause vibrations of the vehicle body while the lock-up clutch 2A is in the engaged position. Generally, the influence of the engine torque variation during engagement of the lock-up clutch 2A on the vibrations of the vehicle body increses with the gear ratio $\rho$ of the automatic transmission 1. The sub-rule IV is provided to reduce the vehicle body vibrations caused by the engagement of the lock-up clutch 2A.

Described more specifically, the sub-rule IV is to determine whether the transmission 1 is placed in its 3rd-speed or 4th-speed position. The logical value of this sub-rule IV is "1" when the 3rd- or 4th-speed position is currently selected. The logical value "0" is obtained if the transmission 1 is placed in the other positions. Namely, the lock-up clutch 2A is engaged only when the transmission 1 is currently placed in the 3rd- or 4th-speed position.

SUB-RULE V

Shift lever placed in DRIVE position

This sub-rule V is provided to permit the engagement of the lock-up clutch 2A only while the shift lever is placed in the DRIVE position. The logical value "1" is obtained while the shift lever is in the DRIVE position. The logical value "0" is obtained while the shift lever is placed in the other positions such as PARKING, NEUTRAL, REVERSE, LOW and SECOND positions.

It is noted that the lock-up clutch 2A does not serve any significant function while the shift lever is in the PARKING or NEUTRAL position Further, while the shift lever is in the REVERSE, LOW or SECOND position, the accelerator pedal tends to be frequently manipulated by the vehicle driver, and the engagement of the lock-up clutch 2A should preferably be avoided.

The logical value of the lock-up clutch engaging control rule consisting of the sub-rules I–V is determined according to the following logical equation (v):

$$L(\text{LOCK-UP CLUTCH ON}) = I \cdot V \cdot [\{(\overline{II+III}) \cdot IV\} + (II+III)] \qquad (v)$$

The lock-up clutch 2A is engaged or disengaged depending upon the logical value "1" or "0" of the above lock-up clutch engaging control rule L (LOCK-UP CLUTCH ON).

In the logical equation (v), $(\overline{II+III})$ represents a negation or NOT operation. According to the equation (v), the lock-up clutch 2A is brought to its engaged position only if the engine speed Ne is stabilized (sub-rule I satisfied) and the shift lever is in the DRIVE position (sub-rule V satisfied), and if the accelerator pedal is neither depressed nor released ($\overline{\text{II}+\text{III}}$) or if the vehicle vibrations are less likely to be generated while the accelerator pedal is operated ($\{(\text{II}+\text{III})\cdot\text{IV}\}$).

It will be understood from the foregoing description that the selection of the operating positions of the automatic transmission 1 and the engagement of the lock-up clutch 2A are automatically effected based on the results of logical operations according to the appropriate control rules, depending upon various running conditions or parameters of the vehicle. In the illustrated embodiment using the control rules, the control programs will not be complicated even though the control rules use various control parameters such as the steering angle, road surface gradient, engine warm-up condition, and transmission oil temperature, in addition to the vehicle running speed and the throttle valve opening used as the basic control parameters for controlling the automatic transmission 1. Therefore, the instant embodiment does not require the microcomputer 4 to have a considerably large capacity (e.g., memory capacity and logical operation time).

In other words, the control rules which use a relatively large number of control parameters are formulated so that the control parameters will not interfere with each other in the determinations associated with the operations of the transmission 1 and the lock-up clutch 2A. Thus, the instant control apparatus and method for the transmission 1 and the lock-up clutch 2A provide a well balanced control system wherein the control parameters are adequately utilized and processed so as to permit an optimum matching of the various running conditions of the vehicle.

In the conventional system, the option taken by the vehicle driver in connection with the shifting operations of the transmission is rather limited. For instance, the driver may select a desired set of shift pattern relationships, depending upon a selected one of a plurality of vehicle running modes such as POWER DRIVE and ECONOMY DRIVE modes. The illustrated embodiments described above, however, may provide the vehicle driver with an expanded control option for assuring an intricate or sophisticated control of the transmission 1 such that the driver's intention or requirement may be faithfully reflected on the operation of the transmission, without an intererence of the control parameters. For example, the driver may add to the control rules, sub-rules for noiseless running of the vehicle, and/or sub-rules for restricting the frequency of shifting of the transmission 1.

The conventional system more or less permits a noiseless operation of the engine when the ECONOMY DRIVE mode is selected. However, the driver's and passengers' room as an enclosed compartment of a motor vehicle inevitably suffers from booming noises whose level is raised at specific frequencies (corresponding to certain ranges of the engine speed or vehicle running speed). The control apparatus and method according to the invention can be readily adapted to utilize suitable sub-rules for controlling the transmission 1 while avoiding the running conditions of the vehicle which may cause the vehicle vibrations, to thereby effectively minimize the booming noises.

In the illustrated embodiments, the logical value of each sub-rule of the control rules is determined to be "1" or "0" even where the determination as to the logical value is doubtful. Stated differently, there are some cases where it is difficult to make an undoubtful decision as to whether the sub-rules are satisfied or not. Further, the value $\Delta N$ which determines the next selected position Nsh of the transmission 1 is incremented and/or decremented to perform logical operations of the control rules for the changing values $\Delta N$. The transmission 1 is shifted to the position Nsh ($=N+\Delta N$) when the control rule for $\Delta N$ ($=$Nsh $-$N) is satisfied during the incrementing or decrementing of the value $\Delta N$. That is, when the logical value "1" of any control rule is obtained for the first time with respect to the value $\Delta N$, the next selected position Nsh of the transmission 1 is determined by that value $\Delta N$, and the logical operations of the other or remaining control rules are not performed.

The above control arrangement preferably requires improvements, for the following reasons:

The control rules are formulated so as to satisfy a driver's requirements. For instance, the driver desires to shift down the transmission 1 from the currently established 3rd-speed position to the 2nd-speed position under some running condition of the vehicle. However, the existence of a driver's requirement or desire cannot be unequivocally determined as either the logical value "1" or the logical value "0" of the appropriate control rule, based on a given threshold value. Generally, it is difficult to determine the threshold value for evaluating a driver's requirement, since the threshold provides a decision between "1" and "0", on the driver's requirement which is sometimes fuzzy.

For instance, a sub-rule is provided to determine whether the driver requires an abrupt acceleration of the vehicle. Suppose the sub-rule is formulated to determine the abrupt acceleration if the accelerator pedal depressing speed $d\theta$acc/dt is equal to or higher than 100%/sec., for example, the determination is such that the requirement for the abrupt vehicle acceleration does not exist if the accelerator pedal depressing speed is 99%/sec. However, this depressing speed 99%/sec. represents a considerable degree of the driver's intention to abruptly accelerate the vehicle. Thus, a control parameter reflecting a driver's requirement or intention may have a "fuzzy" range in which the "1" or "0" determination does not accurately reflect the driver's intention. If many sub-rules for such control parameters are used, a combination of the logical values of the sub-rules may considerably deviate from the actual driver's intention or requirement.

The embodiments of the invention which will be described are adapted to deal with the inconveniences described above, by utilizing the "fuzzy set" theory for logical operations of the control rules. These embodiments are constructed as shown in FIGS. 1, 2, 3, 4 and 6, but use modified control programs for controlling the transmission 1, and/or the lock-up clutch 2A, as described below.

Figure 8:
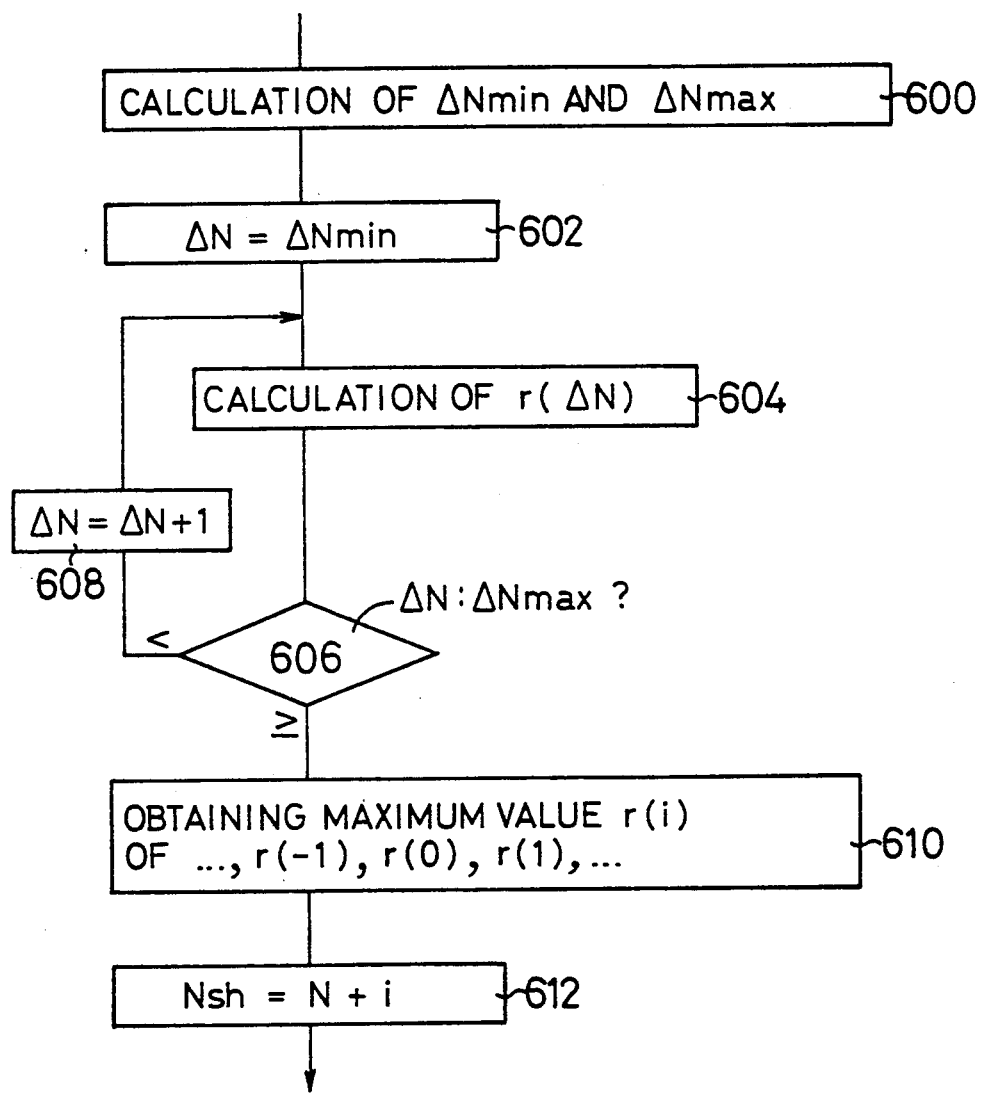
FIG. 8 is a flow chart corresponding to that of FIG. 5, indicating an application of the fuzzy set theory to the control program of FIG. 5.

Referring to FIG. 8, there is shown the embodiment wherein a control program for controlling the automatic transmission 1 utilizes the "fuzzy set" theory.

In the embodiment of FIG. 5, the logical operations of the control rules are sequentially effected by incrementing the value $\Delta N$, from $\Delta N=0$ to $\Delta N=+3$ and decrementing the value from $\Delta N=-1$ to $\Delta N=-3$. However, the logical operations are terminated when the control rule for any value $\Delta N$ is satisfied, and this value ΔN is used to determine the next selected position Nsh (=N+ΔN) of the transmission 1.

In the embodiment of FIG. 8, however, the logical operations of all the control rules for ΔN=0, +1, +2, +3, −1, −2 and −3 are performed to determine the degrees in which the control rules are satisfied. The next selected position Nsh (N+ΔN) is determined by the value ΔN whose control rule is satisfied in the highest degree.

There will be described the process steps of the control routine of FIG. 8.

STEP 600

Permissible minimum and maximum values ΔNmin and ΔNmax of ΔN are calculated.

STEP 602

The value ΔN is set to ΔNmin.

STEP 604

The satisfaction degree r(ΔN) of the control rule for each value ΔN (=0, +1, +2, +3, −1, −2 and −3) which determines the next selected position Nsh=N+ΔN is calculated. The satisfaction degree r(ΔN) is held within the range defined by $0 \leq r(\Delta N) \leq 1$. If the control rule is perfectly unsatisfied, the satisfaction degree r(ΔN) is equal to "0". If the control rule is perfectly satisfied, the satisfaction degree r(ΔN) is equal to "1". In the other cases, the satisfaction degree r(ΔN) varies over the range defined by $0 < r(\Delta N) < 1$.

STEP 606

If the value ΔN has reached ΔNmax, step 606 is followed by step 610. If the value ΔN has not reached ΔNmax, step 606 is followed by step 608.

STEP 608

The value ΔN is incremented. This step 608 is followed by step 604 so that steps 604 and 606 are repeated.

STEP 610

The determined satisfaction degrees r(ΔN) of the control rules for all values ΔN are examined to find out the control rule (and the corresponding value ΔN) which has the highest satisfaction degree r(i).

STEP 612

The next selected position Nsh of the transmission 1 is determined as Nsh=N+i.

The control rules used in step 604 will be described.

(11) Current-Position Holding Control Rule Where ΔN=0

SUB-RULE Ax

Possible to provide desired vehicle drive torque Td*

Figure 9:
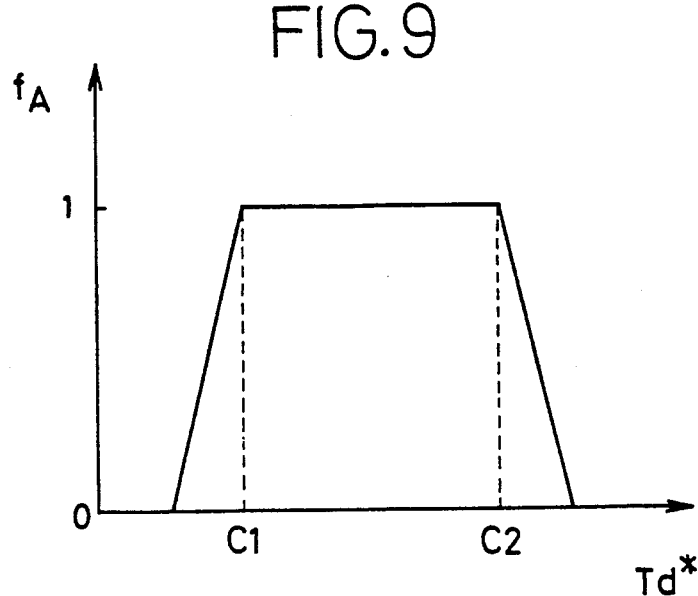
FIG. 9 is a graph indicating the fuzzy set membership function with respect to the target vehicle drive torque, according to the fuzzy set theory.

This sub-rule Ax corresponds to the sub-rule A of the control rule (1) explained above. The satisfaction degree $r_A$ of the sub-rule Ax is expressed as a function of the desired vehicle drive torque Td*, i.e., as $f_A(Td^*)$, as indicated in FIG. 9. This function will be referred to as "fuzzy set membership function".

SUB-RULE Bx

Actual engine speed Ne close to desired engine speed Ne*

Figure 10:
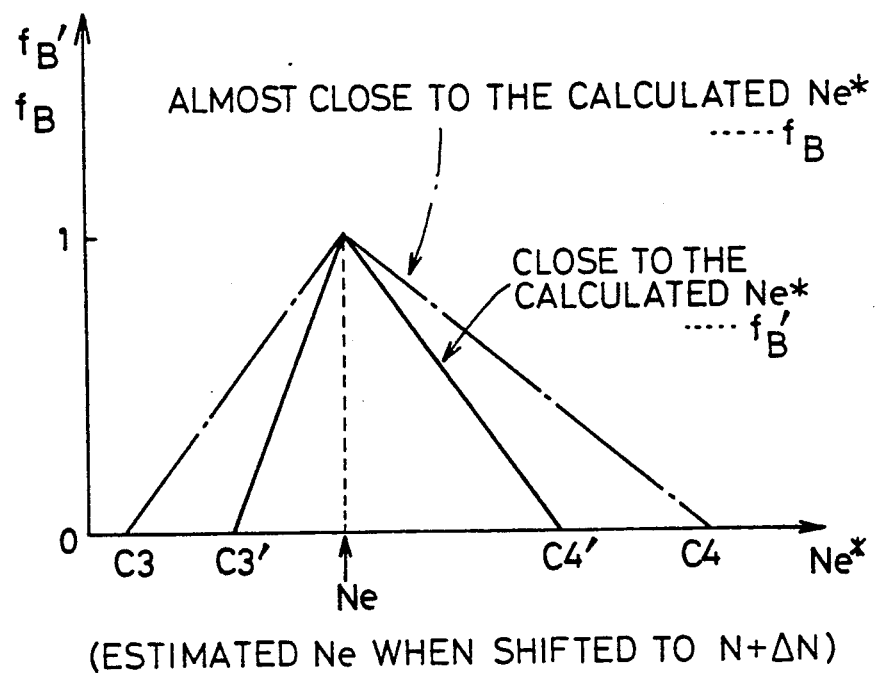
FIG. 10 is a graph indicating the fuzzy set membership function with respect to a target engine speed.

This sub-rule Bx corresponds to the sub-rule B of the control rule (1). The satisfaction degree $r_B$ of the sub-rule Bx is expressed as a function of the desired engine speed Ne*, i.e., as $f_B(Ne^*)$, as indicated in FIG. 10.

Figure 11:
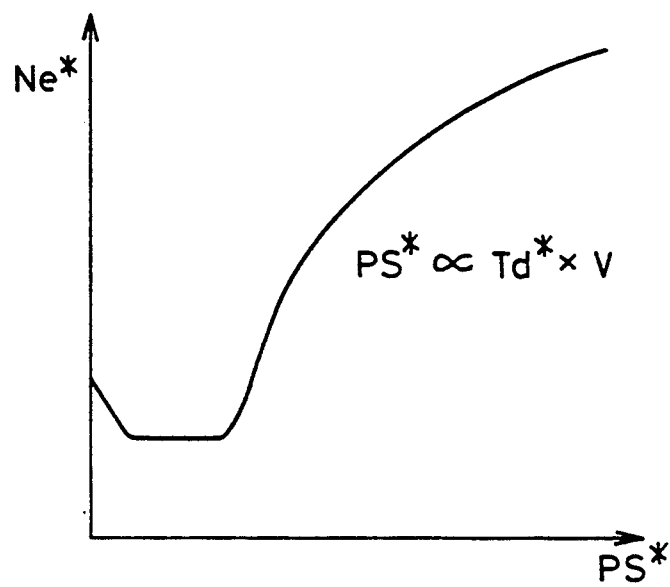
FIG. 11 is a graph indicating a relationship for use for determining the target engine speed based on a target vehicle horsepower value.

In the present embodiment, the desired engine speed Ne* is determined with a desired horsepower PS* used as a parameter. The desired horsepower PS* is proportional to a product of the desired vehicle drive torque Td* and the vehicle speed V. An example of a relationship between the desired engine speed Ne* and the desired horsepower PS* is shown in FIG. 11. This relationship is determined such that the fuel economy, engine running stability, engine knocking condition and other factors are taken into consideration.

SUB-RULE Cx

Actual engine speed Ne within a permissible range

Figure 12:
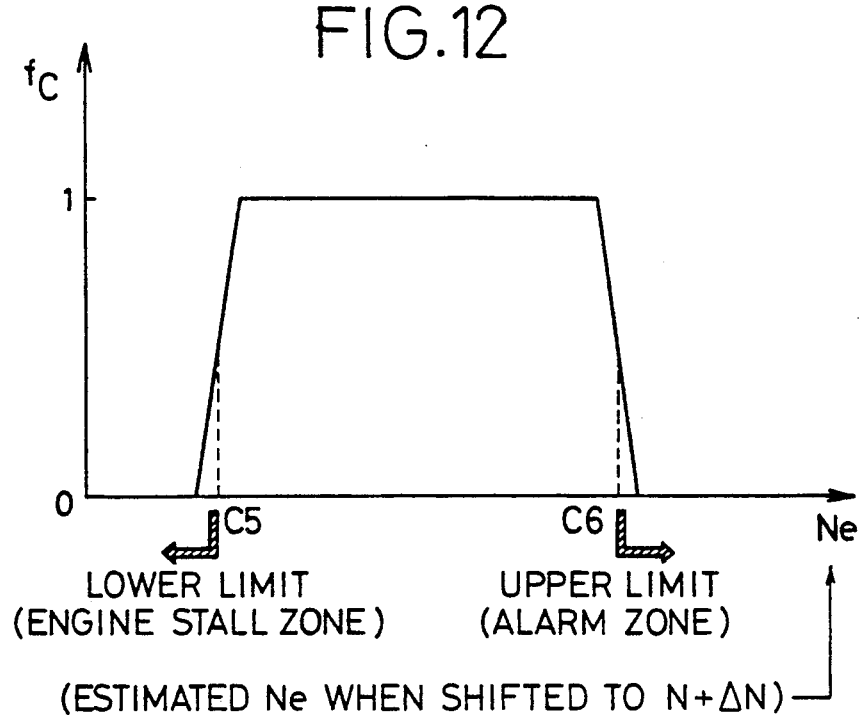
FIG. 12 is a graph indicating the fuzzy set membership function with respect to a permissible engine speed range.

This sub-rule Cx corresponds to the sub-rule C of the control rule (1). The satisfaction degree $r_C$ of the sub-rule Cx is expressed as a function of the actual engine speed Ne, i.e., as $f_C(Ne)$, as indicated in FIG. 12.

The current-position holding control rule (11) where ΔN=0 has the above-described sub-rules. In this case, the control rule (11) is expressed as R(ΔN=0)=Ax and Bx and Cx.

According to the fuzzy set theory, "and" represents an algebraic multiplication (ordinary multiplication), or a minimum operation. Where the "and" represents the algebraic multiplication, an overall satisfaction degree r(ΔN=0) of the control rule (11) where ΔN=0 is expressed by the following equation (xi):

$$r(\Delta N=0) = r_A \times r_B \times r_C \qquad (xi)$$

(12) First Shift-up Control Rule Where ΔN=+1

SUB-RULE Ax

Possible to provide desired vehicle drive torque Td*

This sub-rule Ax is similar to the sub-rule Ax of the control rule (11).

SUB-RULE B'x

Actual engine speed Ne close to desired engine speed Ne*

This sub-rule B'x is similar to the sub-rule Bx of the control rule (11). The prime attached to letter "B" has the same significance as that of the sub-rule B' with respect to the sub-rule B in the preceding embodiment of FIG. 5. The function fB' is indicated in FIG. 10.

SUB-RULE Cx

Actual engine speed Ne within a permissible range

This sub-rule Cx is similar to the sub-rule C of the control rule (11).

SUB-RULE Dx

Accelerator pedal kept at a same position

Figure 13:
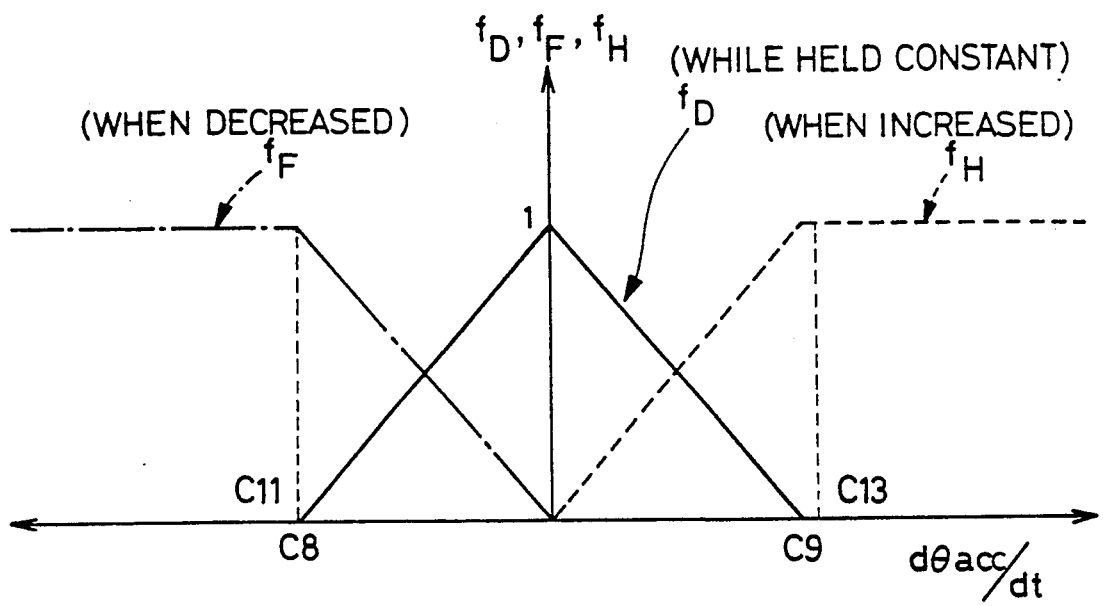
FIG. 13 is a graph indicating the fuzzy set membership function with respect to the operating state (speed) of an accelerator pedal.

This sub-rule Dx is similar to the sub-rule D of the control rule (2). The satisfaction degree $r_D$ of the sub-rule Dx is expressed as a function of the accelerator pedal depressing speed dθacc/dt, i.e., as $f_D(d\theta acc/dt)$, as indicated in FIG. 13.

SUB-RULE Ex

Long time lapse after the last shifting action of transmission 1

Figure 14:
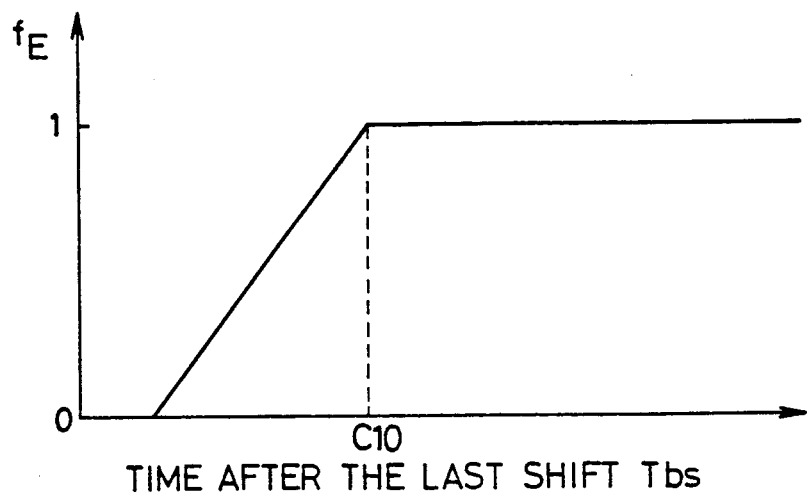
FIG. 14 is a graph indicating the fuzzy set membership function with respect to a time after the last shifting operation of the transmission.

The principle of this sub-rule Ex is similar to that of the sub-rule E of the control rule (2). The satisfaction degree $r_E$ of the sub-rule Ex is expressed as a function of the time lapse Tbs after the last shifting action of the transmission 1, i.e., as $f_E$(Tbs), as indicated in FIG. 14.

SUB-RULE Fx

Accelerator pedal released

The principle of this sub-rule Fx is identical with that of the sub-rule F of the control rule (2). The satisfaction degree $r_F$ of the sub-rule Fx is expressed as a function of the accelerator pedal releasing speed $d\theta acc/dt$, i.e., as $f_F(d\theta acc/dt)$, as indicated in FIG. 13.

SUB-RULE Gx

Vehicle not running along a curved road

Figure 15:
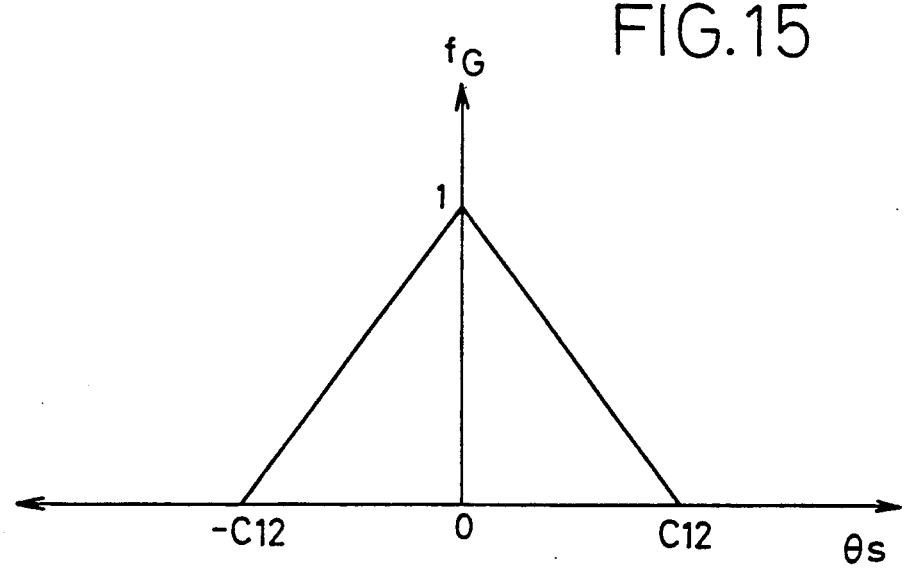
FIG. 15 is a graph indicating the fuzzy set membership function with respect to a steering angle of the vehicle.

The principle of this sub-rule GX is identical with that of the sub-rule of the control rule (2). The satisfaction degree rG of the sub-rule Gx is expressed as a function of the steering angle $\theta s$, i.e., $f_G(\theta s)$, as indicated in FIG. 15.

The first shift-up control rule (12) where $\Delta N = +1$ is expressed as $R(\Delta N = +1) = $ Ax and B'x and Cx and (Dx and Ex) or (Fx and Gx). Where "or (logical sum)" is defined as a maximum operation according to the fuzzy set theory, an overall satisfaction degree $r(\Delta N = +1)$ of the control rule (12) where $\Delta N = +1$ is expressed as the following equation (xii):

$$R(\Delta N=+1) = r_A \times r_B \times r_C \times \{max(r_D \times r_E, r_F \times r_G)\} \quad \text{(xii)}$$

(13) Second Shift-up Control Rule Where $\Delta N = +2, +3$

SUB-RULE Ax

Possible to provide desired vehicle drive torque Td*

This sub-rule Ax is similar to the sub-rule Ax of the control rule (11) described above.

SUB-RULE B'x

Actual engine speed Ne within desired engine speed Ne*

This sub-rule B'x is similar to the sub-rule B'x of the control rule (12).

SUB-RULE Cx

Actual engine speed Ne within a permissible range

This sub-rule Cx is similar to the sub-rule Cx of the control rule (11).

SUB-RULE Fx

Accelerator pedal released

This sub-rule Fx is similar to the sub-rule Fx of the control rule (12).

SUB-RULE Gx

Vehicle not running along a curved road

This sub-rule Gx is similar to the sub-rule Gx of the control rule (12).

The control rule (13) where $\Delta N = +2, +3$ is expressed as $R(\Delta N = +2, +3) = $ Ax and B'x and Cx and Fx and Gx. If "and" is defined as an algebraic multiplication, an overall satisfaction degree $r(\Delta N = +2, +3)$ of the control rule (13) where $\Delta N = +2, +3$ is determined according to the following equation (xiii):

$$r(\Delta N=+2, +3) = r_A \times r_B \times r_C \times r_F \times r_G \quad \text{(xiii)}$$

(14) Shift-down Control Rule Where $\Delta N = -1, -2, -3$

SUB-RULE Ax

Possible to provide desired vehicle drive torque Td*

This sub-rule Ax is similar to the sub-rule Ax of the control rule (11).

SUB-RULE B'x

Actual engine speed Ne close to desired engine speed Ne*

This sub-rule B'x is similar to the sub-rule B'x of the control rule (12).

SUB-rule Cx

Actual engine speed Ne within a permissible range

This sub-rule Cx is similar to the sub-rule Cx of the control rule (11).

SUB-RULE Dx

Accelerator pedal kept at a same position

This sub-rule Dx is similar to the sub-rule Dx of the control rule (12).

SUB-RULE Hx

Accelerator pedal depressed

This sub-rule Hx is similar to the sub-rule H of the control rule (2). The satisfaction degree $r_H$ of the sub-rule Hx is expressed as a function of the accelerator pedal depressing speed $d\theta acc/dt$, i.e., as $f_H(d\theta acc/dt)$, as indicated in FIG. 13.

The shift-down control rule (14) where $\Delta N = -1, -2, -3$ is expressed as $R(\Delta N = -1, -2, -3) = $ Ax and B'x and Cx and (Dx or Hx). An overall satisfaction degree $r(\Delta N = -1, -2, -3)$ of the control rule (14) where $\Delta N = -1, -2, -3$ is determined according to the following equation (xiv):

$$L(\Delta N=-1, -2, -3) = r_A \times r_B \times r_C \times \{max(r_D, r_H)\} \quad \text{(xiv)}$$

While "and" and "or" of the control rules (11) through (14) are defined as algebraic multiplication and maximum operation, respectively, in the above description, it is possible to use other definitions for "and" and "or", according to the fuzzy set theory. For instance, "and" may be defined as minimum operation.

In step 610 of the control routine of FIG. 8, the highest satisfaction degree (i) is selected from $r(-3)$, $r(-2)$, $r(-1)$, $r(0)$, $r(+1)$, $r(+2)$ and $r(+3)$. However, the following equation may be used to select a value "j" which is closest to the distribution center of the satisfaction degrees of the control rules, as indicated at "x" in the graph of FIG. 16 which shows the satisfaction degrees $r(i)$ where $j = \Delta N = -1, 0, 1$ and 2, with the currently selected position $N = 2$, i.e., 2nd-speed position. The distribution center is expressed by the following equation:

$$x = \frac{\sum_{j=\Delta N\min}^{\Delta N\max} j \times r(j)}{\sum_{j=\Delta N\min}^{\Delta N\max} r(j)}$$

$j = \Delta N\min$ through $\Delta N\max$

Figure 16:
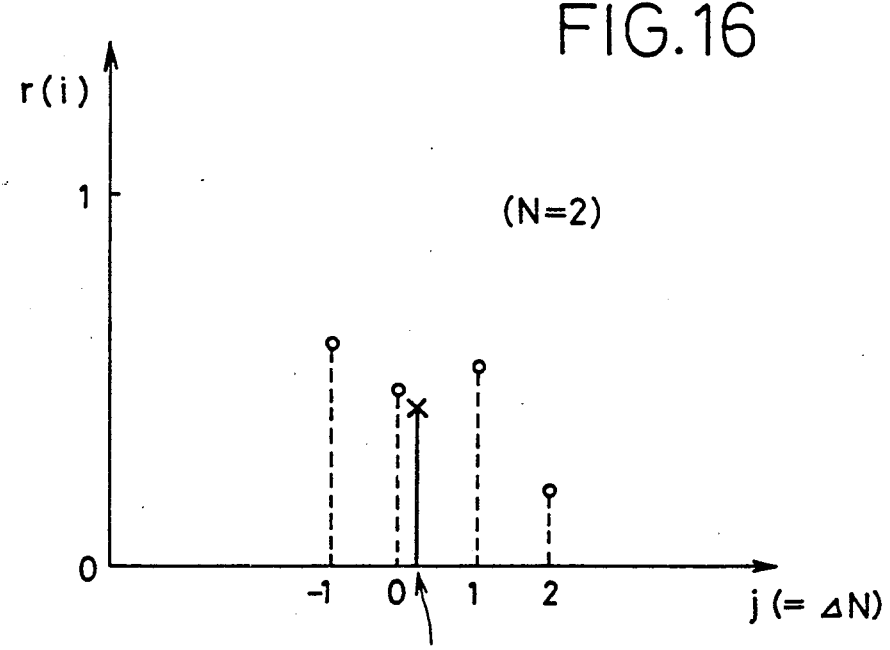
FIG. 16 is a graph explaining the manner of selecting the transmission shift position according to the fuzzy set theory such that the selected position is closest to the center of distribution of the fuzzy set membership function.

The use of the above equation to determine the value "j" closest to the distribution center "x" of the satisfaction degrees $r(\Delta N=-1)$, $r(\Delta N=0)$, $r(\Delta N=1)$ and $r(\Delta N=2)$ has the following advantages:

In the case of FIG. 16 showing the distribution of the satisfaction degrees, the transmission 1 is shifted down from the current 2nd-speed position (N=2) to the 1st-speed position ($\Delta N=-1$) if the next selected position Nsh is determined by the highest satisfaction degree $r(-1)$. However, if the next selected position Nsh is determined according to the above equation, the transmission 1 is kept in the currently selected position (2nd-speed position), since the position $j=0$ is closest to the distribution center "x", as indicated in FIG. 16. The distribution shown has two peaks (at $j=-1$ and at $j=+1$) and a relatively low level therebetween (at $j=0$). This type of distribution does not normally occur. However, some sub-rules may have higher satisfaction degrees where the value $\Delta N$ (i.e., "j") is relatively large, and some sub-rules may have higher satisfaction degrees where the value $\Delta N$ is relatively small. For this reason, there is a possibility that the satisfaction degrees of the control rules has a distribution having two peaks as shown in FIG. 16. In this case, it is desirable to determine the next selected position Nsh of the transmission 1, based on the value "j" closest to the distribution center "x".

Figure 17:
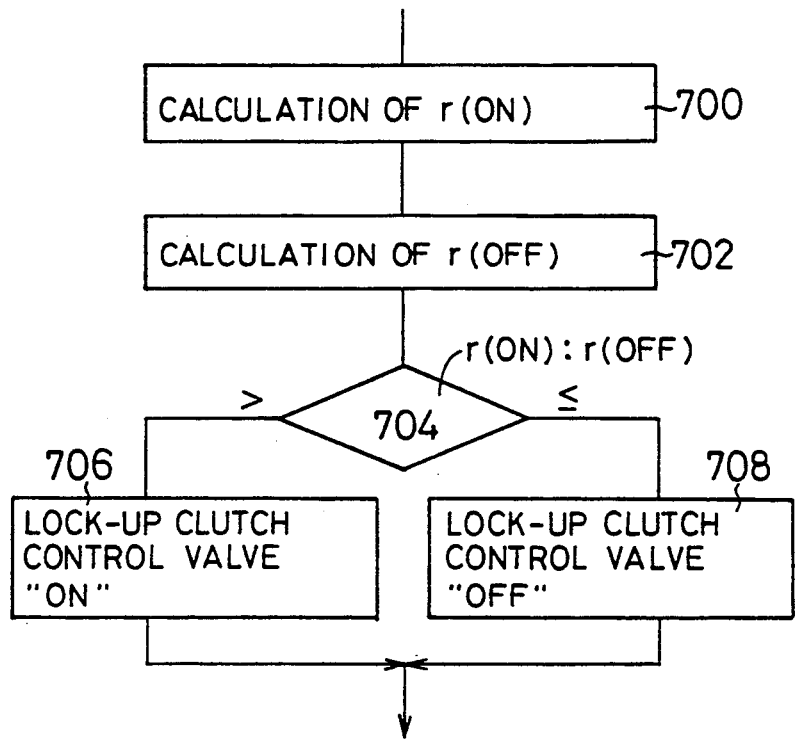
FIG. 17 is a flow chart illustrating a control program for controlling the lock-up clutch control valve according to the fuzzy set theory.

While the manner of controlling the automatic transmission 1 utilizing the fuzzy set theory has been described above, the fuzzy set theory may be applied to control the operation of the lock-up clutch 2A. An example of a control routine for controlling the clutch 2A following the fuzzy set theory is illustrated in FIG. 17.

STEP 700

A satisfaction degree rx (LOCK-UP CLUTCH ON) of a control rule for engagement of the lock-up clutch 2A is calculated.

STEP 702

A satisfaction degree rx (LOCK-UP CLUTCH OFF) of a control rule for disengagement of the lock-up clutch 2A is calculated.

STEPS 704, 706 and 708

If the satisfaction degree rx (LOCK-UP CLUTCH ON) is higher than the satisfaction degree rx (LOCK-UP CLUTCH OFF), the lock-up clutch 2A is engaged in step 706. If not, the lock-up clutch 2A is disengaged or released.

There will be described the control rules used in steps 700 and 702.

(15) Lock-up Clutch Engaging Control Rule Used in Step 700

SUB-RULE Ix

Engine speed Ne stabilized

Figure 7:
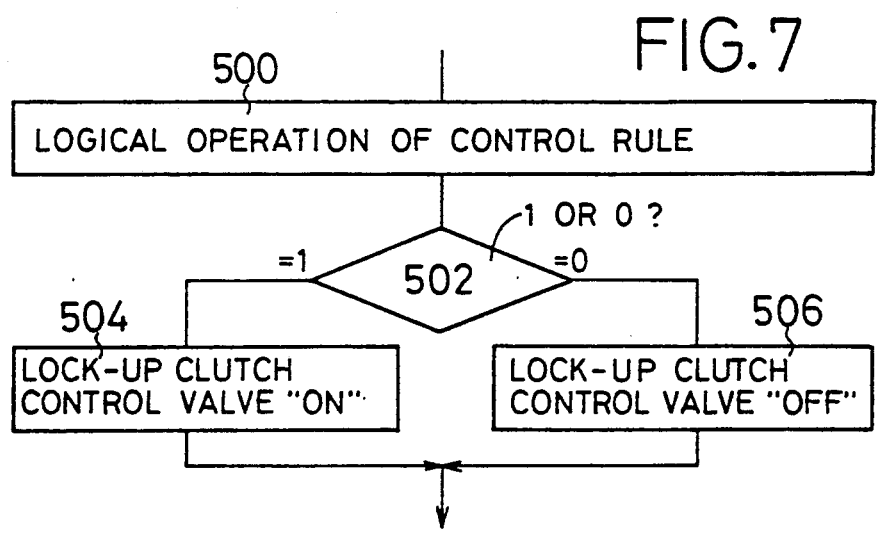
FIG. 7 is a flow chart showing a control program for controlling the lock-up clutch control valve.
Figure 18:
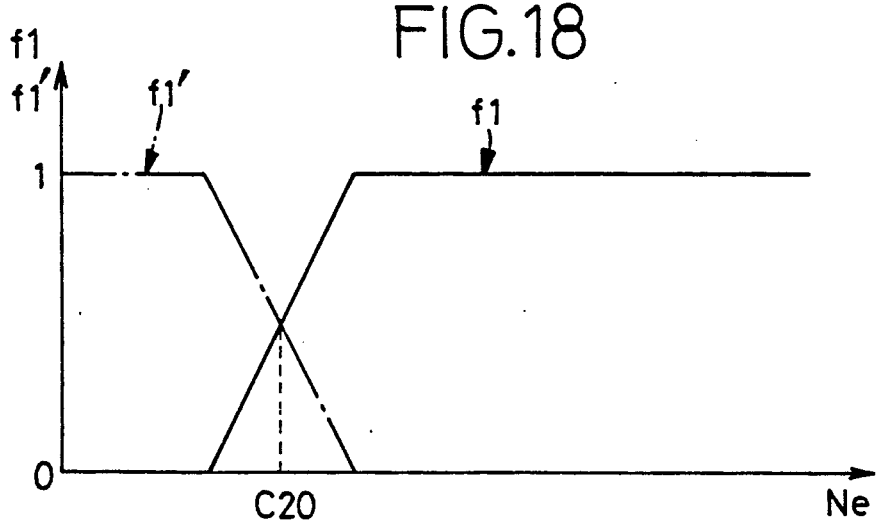
FIG. 18 is a graph showing the fuzzy set membership function with respect to a stable range of the engine speed.

This sub-rule Ix is identical with the sub-rule I of the lock-up clutch engaging control rule used in the control routine of FIG. 7. The satisfaction degree r1 of the sub-rule Ix is expressed as a function of the estimated engine speed Ne after engagement of the clutch 2A, i.e., as f1(Ne), as indicated in FIG. 18.

SUB-RULE IIx

Accelerator pedal depressed

This sub-rule IIx is similar to the sub-rule Hx of the control rule (14) described above.

SUB-RULE IIIx

Accelerator pedal released

This sub-rule IIIx is similar to the sub-rule Fx of the control rule (12).

SUB-RULE IVx

Vibrations less likely to be generated

The principle of this sub-rule IVx is similar to that of the sub-rule IV of the lock-up clutch engaging control rule used in the control routine of FIG. 7. If the transmission 1 is currently placed in the 3rd-speed or 4th-speed position, the satisfaction degree r4 of the sub-rule IVx is set to "1". In the other positions of the transmission 1, the satisfaction degree r4 is set to "0".

SUB-RULE Vx

Shift lever placed in DRIVE position

The principle of this sub-rule Vx is identical with that of the sub-rule V of the control rule used in the control routine of FIG. 7. If the shift lever is placed in the DRIVE position, the satisfaction degree r5 of the sub-rule Vx is set to "1". If not, the satisfaction degree r5 is set to "0".

SUB-RULE VIx

Accelerator pedal kept at a same position

This sub-rule VIx is similar to the sub-rule Dx of the control rule (12).

The lock-up clutch engaging control rule (15) having the above-indicated sub-rules is expressed as R (LOCK-UP CLUTCH ON)=Ix and [{(IIIx or IIx) and IVx} or VIx] and Vx.

The overall satisfaction degree rx (LOCK-UP CLUTCH ON) of the lock-up clutch engaging control rules (15) is determined according to the following equation:

$$rx\ (LOCK\text{-}UP\ CLUTCH\ ON) = r1 \times max\{max(r3, r2) \times r4, r6\} \times r5$$

(16) Lock-up Clutch Disengaging Control Rule Used in Step 702

SUB-RULE I'x

Engine speed Ne not stabilized

This sub-rule I'x has a meaning contrary to that of the sub-rule Ix of the control rule (15). The satisfaction degree r1 of the sub-rule I'x is expressed as a function of the engine speed Ne, i.e., as f1'(Ne), as indicated in FIG. 18. The threshold value C20 indicated in FIG. 18 may be determined as a function of the throttle valve opening, as described above with respect to the embodiment of FIG. 7.

SUB-RULE IIx

Accelerator pedal depressed

This sub-rule IIx is similar to the sub-rule IIx of the control rule (15).

SUB-RULE IIIx

Accelerator pedal released

This sub-rule IIIx is similar to the sub-rule IIIx of the control rule (15).

SUB-RULE IV'x

Vibrations likely to be generated

This sub-rule IV'x has a meaning contrary to that of the sub-rule IVx of the control rule (15). If the transmission 1 is currently placed in the 1st-speed or 2nd-speed position, the satisfaction degree r4' of the sub-rule IV'x is set to "1". If not, the satisfaction degree r4' is set to "0".

SUB-RULE V'x

Shift lever not placed in DRIVE position

This sub-rule V'x has a meaning contrary to that of the sub-rule Vx of the control rule (15). If the shift lever is not placed in the DRIVE position, the satisfaction degree r5' of the sub-rule V'x is set to "1". If the shift lever is placed in the DRIVE position, the satisfaction degree r5' is set to "0".

The lock-up clutch disengaging control rule (16) having the above-indicated sub-rules is expressed as R (LOCK-UP CLUTCH OFF)=I'x or {(IIIx or IIx) and IV'x} or V'x The overall satisfaction degree rx of the lock-up clutch disengaging control rule (16) is determined according to the following equation:

$$rx \ (LOCK\text{-}UP \ CLUTCH \ OFF) = max\{r1', max \ (r2, r3) \times r4', r5'\}$$

Figure 19:
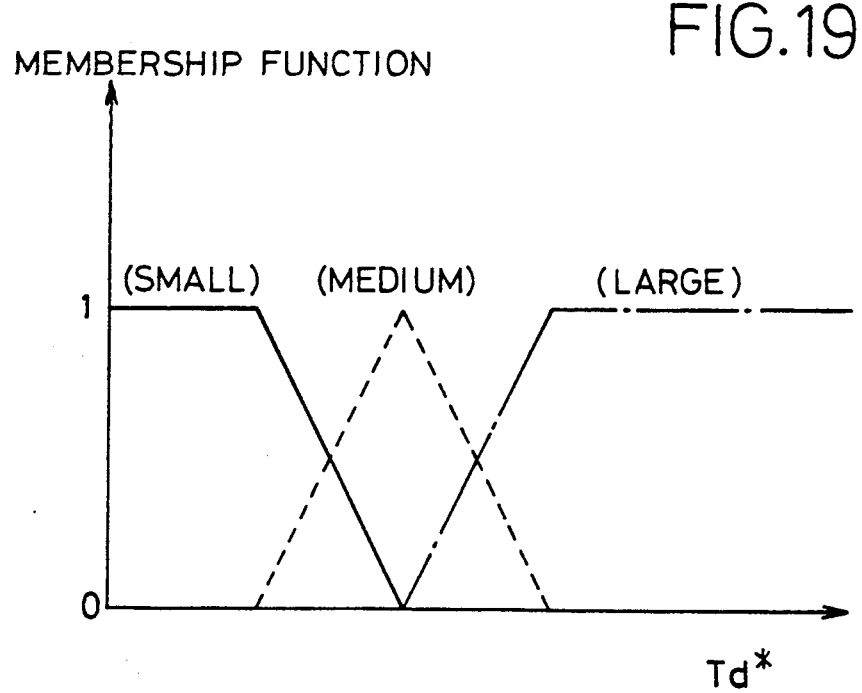
FIG. 19 is a graph showing the fuzzy set membership function with respect to the target vehicle drive torque as an example of a sub-rule threshold.
Figure 20:
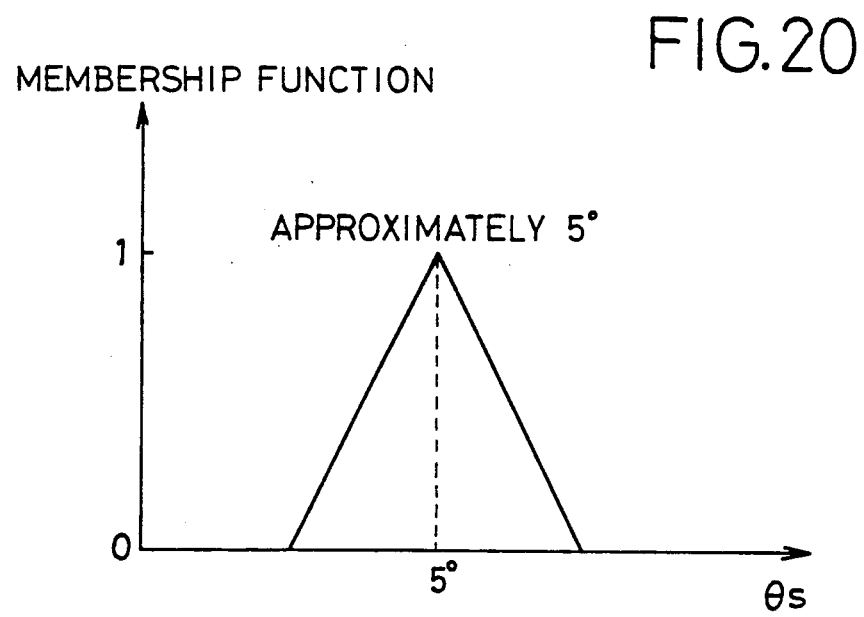
FIG. 20 is a graph showing the fuzzy set membership function with respect to the steering angle as another example of the sub-rule threshold.

In the illustrated embodiments, the input signals such as Ne and $\theta s$ and the processed signals such as Ne* and Td* represent specific values. However, the fuzzy set theory used in the embodiments of FIGS. 8 and 17 permit these signals to represent approximate values or one of a plurality of numerical ranges. For instance, the signal indicative of the desired vehicle drive torque Td* may represent one of three ranges, i.e., a LARGE range in which the value Td* is relatively large, a SMALL range in which the value Td* is relatively small, and a MEDIUM range in which the value Td* is intermediate between the LARGE and SMALL ranges, as illustrated in FIG. 19. Further, the signal indicative of the steering angle $\theta s$ may represent an approximate value, e.g., the signal indicating that the steering angle is approximately 5°, as indicated in FIG. 20.

Accordingly, the required accuracy of the corresponding sensors need not be so high, and the arithmetic equations for processing the signals need not be complicated. Therefore, the instant control apparatus and method are available at a comparatively low cost.

In the embodiment of FIG. 8 using the fuzzy set theory for logical operations to control the automatic transmission 1, the fuzziness as to whether the individual sub-rules are satisfied or not may be suitably dealt with so as to more accurately or faithfully meet the driver's requirements, desires or intention, than in the embodiment of FIG. 5 in which the logical value of each sub-rule is determined to be either "1" or "0".

Figure 21:
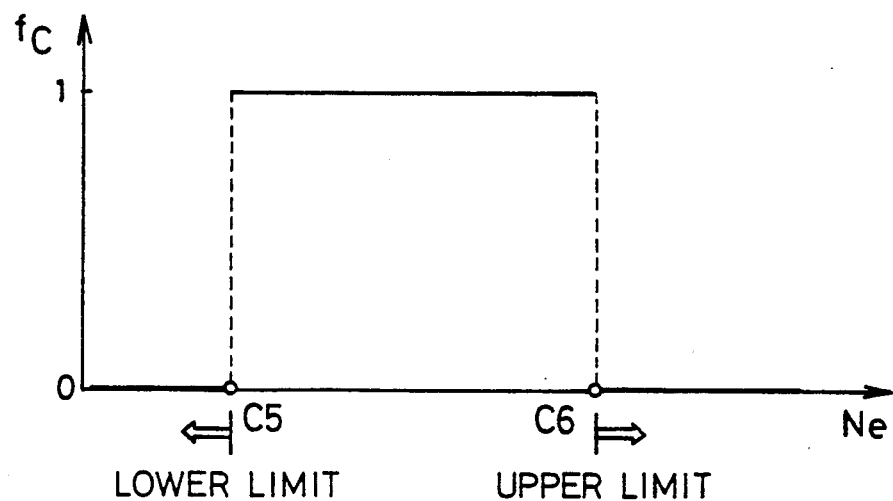
FIG. 21 is a graph showing the fuzzy set membership function in the form of a binary value, with respect to the permissible range of the engine speed.

Although the fuzzy set membership functions used in the embodiments of FIGS. 8 and 17 take a continuously variable value between "0" and "1", the membership functions may be discontinuous values. For example, the membership functions may take either "1" or "0" if the situation permits a clear determination as to whether the sub-rules are satisfied or not. An example of this binary membership function is illustrated in FIG. 21, wherein the membership function of the sub-rule Cs takes a binary value to indicate whether the engine speed Ne falls within the permissible range defined by the lower and upper limits C5 and C6. Such a binary signal may be used for some sub-rules, provided the logical operations are based on the fuzzy set theory as a whole. In this sense, the embodiments of FIGS. 5 and 7 using the binary logical values "1" and "0" may be considered as a unique modification of the embodiments of FIGS. 8 and 17.

While the present invention have been described in its presently preferred embodiments with a certain degree of particularity, it is to be understood that the invention may be embodied with various changes, modifications and improvements, which may occur to those skilled in the art, without departing from the spirit and scope of the invention defined in the following claims.

What is claimed is:

1. A method of controlling an automatic transmission for a motor vehicle having at least three operating gear positions such that the operating positions are automatically selected, comprising the steps of:

(a) preparing a plurality of control rules and a plurality of logical equations which correspond to respective different values of a variable $\Delta N$ representative of the number of the operating position or positions as counted from a currently selected one of said at least three operating positions of the transmission to a newly selected one of said at least three operating positions, said variable $\Delta N$ being zero where said transmission is maintained at said currently selected operating position, positive where said transmission is shifted up from said currently selected operating position to said newly selected operating position, and negative where said transmission is shifted down from said current selected operating position to said newly selected position, each of said control rules comprising a plurality of sub-rules for effecting determinations associated with running conditions of the motor vehicle;

(b) effecting the determinations of said sub-rules of one of said control rules which corresponds to one of said different values of said variable $\Delta N$;

(c) effecting a logical operation according to one of said logical equations which corresponds to said one control rule, based on results of said determinations, and thereby making a decision as to whether said one control rule is satisfied or not;

(d) effecting a shifting action of said transmission according to said one value of said variable $\Delta N$ if said one control rule is satisfied;

(e) if said one control rule is not satisfied, changing said variable $\Delta N$ to another of said different values, effecting the determinations of the sub-rules of another control rule corresponding to said another value of said variable $\Delta N$, effecting a logical operation according to another of said logical equations corresponding to said another control rule, based on the determinations made on said another value of said variable ΔN, and thereby making a decision as to whether said another control rule is satisfied or not, effecting a shifting action of the transmission according to said another value of said variable ΔN if said another control rule is satisfied; and (f) if said another control rule is not satisfied, repeating a step similar to the step (e), for at least one of the other values of said variable ΔN, said one of the other values being greater than the absolute value of one, until any one of said control rules which corresponds to any one of said different values of said variable ΔN is satisfied and the transmission is shifted according to said any one value of the variable ΔN.

2. A method according to claim 1, wherein each of said plurality of control rules includes a sub-rule for selecting the operating position of the transmission in which an actual speed of an engine of the vehicle is maintained at or near a desired speed of the engine, so as to provide a desired vehicle drive torque corresponding to an amount of operation of an accelerator pedal of the vehicle.

3. A method according to claim 1, wherein said plurality of control rules include a current-position holding control rule for maintaining the currently established position of the transmission, a shift-up control rule for shifting up the transmission, and a shift-down control rule for shifting down the transmission.

4. A method according to claim 3, wherein said current-position holding control rule includes:

a sub-rule A for selecting the operating position of the transmission which provides a desired vehicle drive torque which is determined based on an amount of operation of an accelerator pedal and a running speed of the vehicle;

a sub-rule B for selecting the operating position of the transmission in which an actual speed of an engine of the vehicle is maintained at or near a desired speed of the engine, so as to provide said desired vehicle drive torque and minimize a fuel consumption and an operating noise of the engine; and a sub-rule C for selecting the operating position of the transmission which permits the actual speed of the engine to be held within a permissible range that allows a normal operation of the engine, and wherein the logical equation corresponding to said current-position holding control rule is being expressed as $L(\Delta N=0)=A \cdot B \cdot C$.

5. A method according to claim 4, wherein said permissible range is defined by a lower limit below which the engine may stall, and an upper limit which is a permissible highest speed of the engine.

6. A method according to claim 3, wherein said shift-up control rule includes a first shift-up control rule for shifting up the transmission to the operating position which is one position higher than the currently established operating position, and a second shift-up control rule for shifting up the transmission to the operating position which is at least two positions higher than the currently established operating position.

7. A method according to claim 6, wherein said first shift-up control rule includes:

a sub-rule A for selecting the operating position of the transmission which provides a desired vehicle drive torque which is determined based on an amount of operation of an accelerator pedal and a running speed of the vehicle;

a sub-rule B' for selecting the operating position of the transmission in which an actual speed of an engine of the vehicle is maintained at or near a desired speed of the engine, so as to provide said desired vehicle drive torque and minimize a fuel consumption and an operating noise of the engine;

a sub-rule C for selecting the operating position of the transmission which permits the actual speed of the engine to be held within a permissible range that allows a normal operation of the engine;

a sub-rule D representing that a rate at which the accelerator pedal is operated is held within a range which indicates that the accelerator pedal is kept at a substantially same position;

a sub-rule E representing that a time lapse after a last shifting action of the transmission exceeds a predetermined threshold value;

a sub-rule F representing that a rate at which the accelerator pedal is released is lower than a predetermined threshold value; and a sub-rule G representing that a steering angle of the vehicle is smaller than a predetermined threshold value, and wherein the logical equation corresponding to said first shift-up control rule is expressed as $L(\Delta N=+1)=A \cdot B' \cdot C \cdot \{(D \cdot E)+F \cdot G\}$.

8. A method according to claim 6, wherein said second shift-up control rule includes:

a sub-rule A for selecting the operating position of the transmission which provides a desired vehicle drive torque which is determined based on an amount of operation of an accelerator pedal and a running speed of the vehicle;

a sub-rule B for selecting the operating position of the transmission in which an actual speed of an engine of the vehicle is maintained at or near a desired speed of the engine, so as to provide said desired vehicle drive torque and minimize a fuel consumption and an operating noise of the engine;

a sub-rule C for selecting the operating position of the transmission which permits the actual speed of the engine to be held within a permissible range that allows a normal operation of the engine;

a sub-rule F representing that a rate at which the accelerator pedal is released is lower than a predetermined threshold value; and a sub-rule G representing that a steering angle of the vehicle is smaller than a predetermined threshold value, and wherein the logical equation corresponding to said second shift-up control rule is expressed as $L(\Delta N=+2)=A \cdot B \cdot C \cdot F \cdot G$.

9. A method according to claim 6, wherein said shift-down control rule includes:

a sub-rule A for selecting the operating position of the transmission which provides a desired vehicle drive torque which is determined based on an amount of operation of an accelerator pedal and a running speed of the vehicle;

a sub-rule B' for selecting the operating position of the transmission in which an actual speed of an engine of the vehicle is maintained at or near a desired speed of the engine, so as to provide said desired vehicle drive torque and minimize a fuel consumption and an operating noise of the engine;

a sub-rule C for selecting the operating position of the transmission which permits the actual speed of the engine to be held within a permissible range that allows a normal operation of the engine;

a sub-rule D representing that a rate at which the accelerator pedal is operated is held within a range which indicates that the accelerator pedal is kept at a substantially same position; and a sub-rule H representing that a rate at which the accelerator pedal is depressed exceeds a predetermined threshold value above which the transmission should be kicked down to increase the vehicle drive force, and wherein the logical equation corresponding to said shift-down control rule is expressed as $L(\Delta N=-1)=A \cdot B' \cdot C (D+H)$.

10. A method according to claim 1, wherein said transmission is connected to said engine through a lock-up clutch, and said operating positions of the transmission includes at least a 1st-speed position, a 2nd-speed position, a 3rd-speed position and a 4th-speed position, said plurality of control rules including a lock-up clutch engaging control rule for operating said lock-up clutch to an engaged position thereof, said lock-up clutch engaging control rule including a sub-rule I representing that an estimated value of an actual speed of the engine while said lock-up clutch is placed in said engaged position exceeds a predetermined threshold value, a sub-rule II representing that a rate at which the accelerator pedal is depressed exceeds a predetermined threshold value above which the transmission should be kicked down to increase the vehicle drive torque, a sub-rule III representing that a rate at which the accelerator pedal is released is lower than a predetermined threshold value, a sub-rule IV representing that the transmission is currently placed in said 3rd-speed or 4th-speed position, and a sub-rule V representing that a shift lever of the vehicle is placed in a drive position in which the transmission is automatically shifted, and wherein the logical equation corresponding to said lock-up clutch engaging control rule is expressed as $L(\text{LOCK-UP CLUTCH ON}) = I \cdot V \cdot [\{(II+III) \cdot IV\} + (\overline{II+III})]$.

11. A method of controlling an automatic transmission for a motor vehicle having at least three operating gear positions such that the operating positions are automatically selected, comprising the steps of:

preparing a plurality of control rules and a plurality of logical equations which correspond to respective different values of a variable $\Delta N$ representative of the number of the operating position or positions as counted from a currently selected one of said at least three operating positions of the transmission to a newly selected one of said at least three operating positions, said variable $\Delta N$ being zero where said transmission is maintained at said currently selected operating position, positive where said transmission is shifted up from said currently selected operating position to said newly selected operating position, and negative where said transmission is shifted down from said current selected operating position to said newly selected position, each of said control rules comprising a plurality of sub-rules for effecting determinations associated with running conditions of the motor vehicle;

effecting the determinations of said sub-rules of all of said plurality of control rules;

effecting logical operations according to said plurality of logical equations, based on results of said determinations, and thereby calculating degrees of satisfaction of said plurality of control rules; and effecting a shifting action of said transmission to select one of said at least three operating positions which corresponds to one of said control rules whose degree of satisfaction is the highest of all the control rules, wherein said one of said at least three operating positions which corresponds to one of said control rules whose degree of satisfaction is the highest of all the control rules may be separated by at least one intervening operating position from the currently selected one of said at least three operating positions.

12. A method according to claim 11, wherein said step of effecting a logical operation and making a decision comprises expressing the calculated degrees of satisfaction $r(j)$ of said plurality control rules along a first axis of a two-dimensional coordinate system, and the number $j$ of positions between the currently established operating position and the operating positions corresponding to said control rules, along a second axis of said coordinate system, said step further comprising determining a center $x$ of distribution of said calculated degrees of satisfaction, positioning said center $x$ along said second axis of said coordinate system, and selecting said one operating position of the transmission such that said one operating position corresponds to one of said number $j$ of positions which is positioned closest to said distribution center $x$ along said second axis, said center $x$ being determined by the following equation:

$$x = \frac{\sum\limits_{j=\min}^{\max} j \times r(j)}{\sum\limits_{j=\min}^{\max} r(j)}$$

13. A method according to claim 11, wherein said plurality of control rules include a current-position holding control rule for maintaining the currently established position of the transmission, a shift-up control rule for shifting up the transmission, and a shift-down control rule for shifting down the transmission.

14. A method according to claim 11, wherein said current-position holding control rule includes:

a sub-rule Ax for selecting the operating position of the transmission which provides a desired vehicle drive torque which is determined based on an amount of operation of an accelerator pedal and a running speed of the vehicle;

a sub-rule B for selecting the operating position of the transmission in which an actual speed of an engine of the vehicle is maintained at or near a desired speed of the engine, so as to provide said desired vehicle drive torque and minimize a fuel consumption and an operating noise of the engine; and a sub-rule C for selecting the operating position of the transmission which permits the actual speed of the engine to be held within a permissible range that allows a normal operation of the engine, and wherein the logical equation corresponding to said current-position holding control rule is expressed as $R(\Delta N=0)= Ax$ and $Bx$ and $Cx$, and an overall degree of satisfaction $r(\Delta N=0)$ of said current-position control rule is expressed as $r(\Delta N=0)=r_A \times r_B \times r_C$ where, $r_A$, $r_B$ and $r_C$ represent degrees of satisfaction of said sub-rules Ax, Bx and Cx, respectively.

15. A method according to claim 11, wherein said shift-up control rule includes a first shift-up control rule for shifting up said transmission to the operating position which is one position higher than the currently established position, and a second shift-up control rule for shifting up the transmission to the operating position which is at least two positions higher than the currently established operating position.

16. A method according to claim 15, wherein said first shift-up control rule includes:

a sub-rule Ax for selecting the operating position of the transmission which provides a desired vehicle drive torque which is determined based on an amount of operation of an accelerator pedal and a running speed of the vehicle;

a sub-rule B'x for selecting the operating position of the transmission in which an actual speed of an engine of the vehicle is maintained at or near a desired speed of the engine, so as to provide said desired vehicle drive torque and minimize a fuel consumption and an operating noise of the engine;

a sub-rule Cx for selecting the operating position of the transmission which permits the actual speed of the engine to be held within a permissible range that allows a normal operation of the engine;

a sub-rule Dx representing that a rate at which the accelerator pedal is operated is held within a range which indicates that the accelerator pedal is kept at a substantially same position;

a sub-rule Ex representing that a time lapse after a last shifting action of the transmission exceeds a predetermined threshold value;

a sub-rule Fx representing that a rate at which the accelerator pedal is released is lower than a predetermined threshold value; and a sub-rule Gx representing that a steering angle of the vehicle is smaller than a predetermined threshold value, and wherein the logical equation corresponding to said first shift-up control rule is expressed as $R(\Delta N=+1)=$ Ax and B'x and Cx and {(Dx and Ex) or (Fx and Gx)}, and an overall degree of satisfaction $r(\Delta N=+1)$ of said first shift-up control rule is expressed as $r(N=+1)=r_A \times r_{B'} \times r_C \times \{\max(r_D \times r_E, r_F \times r_G)\}$, where, $r_A$, $r_{B'}$, $r_C$, $r_D$, $r_E$, $r_F$ and $r_G$ represent degrees of satisfaction of said sub-rules Ax, B'x, Cx, Dx, Ex, Fx and Gx, respectively.

17. A method according to claim 15, wherein said second shift-up control rule includes:

a sub-rule Ax for selecting the operating position of the transmission which provides a desired vehicle drive torque which is determined based on an amount of operation of an accelerator pedal and a running speed of the vehicle;

a sub-rule B'x for selecting the operating position of the transmission in which an actual speed of an engine of the vehicle is maintained at or near a desired speed of the engine, so as to provide said desired vehicle drive torque and minimize a fuel consumption and an operating noise of the engine;

a sub-rule Cx for selecting the operating position of the transmission which permits the actual speed of the engine to be held within a permissible range that allows a normal operation of the engine;

a sub-rule Fx representing that a rate at which the accelerator pedal is released is lower than a predetermined threshold value; and a sub-rule Gx representing that a steering angle of the vehicle is smaller than a predetermined threshold value, and wherein the logical equation corresponding to said second shift-up control rule is expressed as $R(\Delta N=+2)=$ Ax and Bx' and Cx and Fx and Gx, and an overall degree of satisfaction $r(\Delta N=+2)$ of said second shift-up control rule is expressed as $r(N=+2)=r_A \times r_{B'} \times r_C \times r_F \times r_G$, where, $r_A$, $r_{B'}$, $r_C$, $r_F$ and $r_G$ represent degrees of satisfaction of said sub-rules Ax, Bx', Cx, Fx and Gx, respectively.

18. A method according to claim 11, wherein said shift-down control rule includes:

a sub-rule Ax for selecting the operating position of the transmission which provides a desired vehicle drive torque which is determined based on an amount of operation of an accelerator pedal and a running speed of the vehicle;

a sub-rule B'x for selecting the operating position of the transmission in which an actual speed of an engine of the vehicle is maintained at or near a desired speed of the engine, so as to provide said desired vehicle drive torque and minimize a fuel consumption and an operating noise of the engine;

a sub-rule Cx for selecting the operating position of the transmission which permits the actual speed of the engine to be held within a permissible range that allows a normal operation of the engine;

a sub-rule Dx representing that a rate at which the accelerator pedal is operated is held within a range which indicates that the accelerator pedal is kept at a substantially same position; and a sub-rule Hx representing that a rate at which the accelerator pedal is depressed exceeds a predetermined threshold value above which the transmission should be kicked down to increase the vehicle drive torque, and wherein the logical equation corresponding to said shift-down control rule is expressed as $R(\Delta N=-1)=$ Ax and Bx' and Cx and (Dx or Hx), and an overall degree of satisfaction $r(\Delta N=-1)$ of said shift-down control rule is expressed as $r(\Delta N=-1)=r_A \times r_{B'} \times r_C \times \{\max(r_D, r_H)\}$, where, $r_A$, $r_{B'}$, $r_C$, $r_D$ and $r_H$ represent degrees of satisfaction of said sub-rules Ax, B'x, Cx, Dx and Hx, respectively.

19. A method according to claim 11, wherein said transmission is operatively connected to said engine through a lock-up clutch interposed therebetween, and said operating positions of the transmission includes a 1st-speed position, a 2nd-speed position, a 3rd-speed position and a 4th-speed position, said plurality of control rules further including a lock-up clutch engaging control rule for operating said lock-up clutch to an engaged position thereof, and a lock-up clutch disengaging control rule for operating the lock-up clutch to a disengaged position thereof, and wherein said lock-up clutch engaging control rule includes:

a sub-rule Ix representing that an estimated value of an actual speed of the engine while said lock-up clutch is placed in said engaged position exceeds a predetermined threshold value;

a sub-rule IIx representing that a rate at which the accelerator pedal is depressed exceeds a predetermined threshold value above which the transmission should be kicked down to increase the vehicle drive torque;

a sub-rule IIIx representing that a rate at which the accelerator pedal is released is lower than a predetermined threshold value;

a sub-rule IVx representing that the transmission is currently placed in said 3rd-speed or 4th-speed position;

a sub-rule Vx representing that a shift lever of the vehicle is placed in a drive position in which the transmission is automatically shifted; and a sub-rule VIx representing that the rate at which the accelerator pedal is operated is held within a range in which the accelerator pedal is kept at a substantially same position, and wherein said lock-up clock disengaging control rule includes:

a sub-rule I'x representing that said estimated value of the actual speed of the engine is lower than said predetermined threshold value;

said sub-rule IIx;

said sub-rule IIIx;

a sub-rule IV' representing that the transmission is currently placed in said 1st-speed position or 2nd-speed position; and a sub-rule V' representing that said shift lever is not placed in said drive position, and wherein the logical equation corresponding to said lock-up clutch engaging control rule is expressed as Rx(LOCK-UP CLUTCH ON)=Ix and [{(IIIx or IIx) and IVx} or VIx] and Vx, and an overall degree of satisfaction of said lock-up clutch engaging control rule is expressed as r1×max {max (r3, r2)×r4, r6 }×r5, where r1, r2, r3, r4, r5 and r6 represent the degrees of satisfaction of said sub-rules Ix, IIx, IIIx, IVx, Vx and VIx, and wherein the logical equation corresponding to said lock-up clutch disengaging control rule is expressed as Rx(LOCK-UP CLUTCH OFF)=I'x or {(IIIx or IIx) and IV'x} or V'x, and an overall degree of satisfaction of said lock-up clutch disengaging control rule is expressed as max {r1', max (r2, r3)×r4', r5'}.

20. An apparatus for controlling an automatic transmission for a motor vehicle having at least three operating gear positions such that the operating positions are automatically selected, comprising:

memory means for storing a plurality of control rules and a plurality of logical equations which correspond to respective different values of a variable $\Delta N$ representative of the number of the operating position or positions as counted from a currently selected one of said at least three operating positions of the transmission to a newly selected one of said at least three operating positions, said variable $\Delta N$ being zero where said transmission is maintained at said currently selected operating position, positive wherein said transmission is shifted up from said currently selected operating position to said newly selected operating position, and negative where said transmission is shifted down from said current selected operating position to said newly selected position, each of said control rules comprising a plurality of sub-rules for effecting determinations associated with running conditions of the motor vehicle;

determining means for effecting the determinations of said sub-rules of one of said control rules which corresponds to one of said different values of said variable $\Delta N$, effecting a logical operation according to one of said logical equations which corresponds to said one control rule, based on results of said determinations, and thereby making a decision as to whether said one control rule is satisfied or not;

shifting means for effecting a shifting action of said transmission according to said one value of said variable $\Delta N$ if said one control rule is satisfied;

variable changing means operable if said one control rule is not satisfied, for changing said variable $\Delta N$ to another of said different values, said determining means effecting the determinations of the sub-rules of another control rule corresponding to said another value of said variable $\Delta N$, effecting a logical operation according to another of said logical equations corresponding to said another control rule, based on the determinations made on said another value of said variable $\Delta N$, and thereby making a decision as to whether said another control rule is satisfied or not, so that said shifting means effects a shifting action of the transmission according to said another value of said variable $\Delta N$ if said another control rule is satisfied, said variable changing means and said determining means being operated if said another control rule is not satisfied, for repeating determinations, a logical operation and a decision similar to those effected on said another value of said variable $\Delta N$, for at least one of the other values of said variable $\Delta N$, said one of the other values being greater than the absolute value of one, until any one of said control rules which corresponds to any one of said different values of said variable $\Delta N$ is satisfied and the transmission is shifted according to said any one value of the variable $\Delta N$.

21. An apparatus according to claim 20, wherein each of said plurality of control rules stored in said memory means includes a sub-rule for selecting the operating position of the transmission in which an actual speed of an engine of the vehicle is maintained at or near a desired speed of the engine so that said engine provides a desired vehicle drive torque corresponding to an amount of operation of an accelerator pedal of the vehicle.

22. An apparatus according to claim 20, wherein said plurality of control rules stored in said memory means include a current-position holding control rule for maintaining the currently established position of the transmission, a shift-up control rule for shifting up the transmission, and a shift-down control rule for shifting down the transmission, said determining means sequentially performing the logical operations of said plurality of control rules according to the corresponding logical equations, to make decisions as to whether the control rules are satisfied or not, said determining means selecting as a desired position to be selected next, the operating position of the transmission corresponding to one of the control rules which is first determined to be satisfied.

23. An apparatus for controlling an automatic transmission for a motor vehicle having at least three operating gear positions such that the operating positions are automatically selected, comprising:

memory means for storing a plurality of control rules and plurality of logical equations which correspond to respective different values of a variable $\Delta N$ representative of the number of the operating position or positions as counted from a currently selected one of said at least three operating positions of the transmission to a newly selected one of said at least three operating positions, said variable $\Delta N$ being zero where said transmission is maintained at said currently selected operating position, positive wherein said transmission is shifted up from said currently selected operating position to said newly selected operating position, and negative where said transmission is shifted down from said current selected operating position to said newly selected position, each of said control rules comprising a plurality of sub-rules for effecting determinations associated with running conditions of the motor vehicle;

determining means for effecting the determinations of said sub-rules of all of said plurality of control rules, effecting logical operations according to said plurality of logical equations, based on results of said determinations, and thereby calculating degrees of satisfaction of said plurality of control rules; and shifting means for effecting a shifting action of said transmission to select one of said at least three operating positions which corresponds to one of said control rules whose degree of satisfaction is the highest of all the control rules, wherein said one of said at least three operating positions which corresponds to one of said control rules whose degree of satisfaction is the highest of all the control rules may be separated by at least one intervening operating position from the currently selected one of said at least three operating positions.

24. An apparatus according to claim 23, wherein said determining means selects said one operating position which corresponds to one of the control rules whose degree of satisfaction is the highest of all the control rules.

25. An apparatus according to claim 23, wherein said determining means comprises means for expressing the calculated degrees of satisfaction r(j) of said plurality control rules along a first axis of a two-dimensional coordinate system, and the number j of positions between the currently established operating position and the operating positions corresponding to said control rules, along a second axis of said coordinate system, said determining means further comprising means for determining a center x of distribution of said calculated degrees of satisfaction, and positioning said center x along said second axis of said coordinate system, and means for selecting said one operating position of the transmission such that said one operating position corresponds to one of said number j of positions which is positioned closest to said distribution center x along said second axis, said center x being determined by the following equation:

$$x = \frac{\sum_{j=\min}^{\max} j \times r(j)}{\sum_{j=\min}^{\max} r(j)}$$

* * * * *